(12) United States Patent
Choi et al.

(10) Patent No.: US 12,375,593 B2
(45) Date of Patent: Jul. 29, 2025

(54) ROLLABLE ELECTRONIC DEVICE

(71) Applicant: SAMSUNG ELECTRONICS CO., LTD., Suwon-si (KR)

(72) Inventors: Junyoung Choi, Suwon-si (KR); Youngmin Kang, Suwon-si (KR); Moonchul Shin, Suwon-si (KR); Yeonggyu Yoon, Suwon-si (KR); Seungjoon Lee, Suwon-si (KR); Joongyeon Cho, Suwon-si (KR); Myunghoon Kwak, Suwon-si (KR); Yongjin Kwon, Suwon-si (KR); Soyoung Lee, Suwon-si (KR); Jookwan Lee, Suwon-si (KR); Junghyeob Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 17/903,259

(22) Filed: Sep. 6, 2022

(65) Prior Publication Data

US 2023/0144003 A1 May 11, 2023

Related U.S. Application Data

(63) Continuation of application No. PCT/KR2022/011503, filed on Aug. 3, 2022.

(30) Foreign Application Priority Data

Nov. 11, 2021 (KR) ........................ 10-2021-0154567

(51) Int. Cl.
*H04M 1/02* (2006.01)

(52) U.S. Cl.
CPC ....... *H04M 1/0237* (2013.01); *H04M 1/0268* (2013.01)

(58) Field of Classification Search
CPC ........ G06F 1/16; G06F 1/1624; G06F 1/1628; G06F 1/1652; G09F 9/30–302; H04M 1/0235–0239; H04M 1/0268–0269
See application file for complete search history.

(56) References Cited

U.S. PATENT DOCUMENTS

| 10,747,269 B1 | 8/2020 | Choi et al. |
| 11,003,219 B1 * | 5/2021 | Kim ..................... G06F 1/1652 |

(Continued)

FOREIGN PATENT DOCUMENTS

| CN | 113194176 A | 7/2021 |
| CN | 113516920 A | 10/2021 |

(Continued)

OTHER PUBLICATIONS

International Search Report dated Nov. 2, 2022 for PCT/KR2022/011503.

(Continued)

*Primary Examiner* — Ronald Eisner
(74) *Attorney, Agent, or Firm* — Nixon & Vanderhye P.C.

(57) ABSTRACT

An electronic device may include a housing; a sliding frame, at least a portion of which is drawn out from the housing in a first direction, or at least a portion of which is retracted into the housing in a second direction; a flexible display including a first region visible from the outside, and a second region extending from the first region and varying in size; and a bending member disposed on a rear surface of the flexible display, the bending member including a plurality of bars arranged in a certain interval. The bending member may include a first bar including at least one first locking part protruding in an inner direction of the electronic device.

20 Claims, 30 Drawing Sheets

(56) References Cited

U.S. PATENT DOCUMENTS

| | | | |
|---|---|---|---|
| 11,042,195 B1 | 6/2021 | Hong et al. |
| 11,050,866 B1 | 6/2021 | Choi et al. |
| 11,457,104 B2 | 9/2022 | Seol et al. |

FOREIGN PATENT DOCUMENTS

| | | | |
|---|---|---|---|
| KR | 10-2016-0127277 A | 11/2016 |
| KR | 10-2016-0141255 | 12/2016 |
| KR | 10-2017-0019043 A | 2/2017 |
| KR | 10-2021-0031348 A | 3/2021 |
| KR | 10-2290231 | 8/2021 |
| KR | 10-2290231 B1 | 8/2021 |
| KR | 10-2322915 B1 | 11/2021 |
| WO | WO 2020/262713 A1 | 12/2020 |
| WO | WO 2021/015310 A1 | 1/2021 |
| WO | WO 2021/151473 A1 | 8/2021 |
| WO | WO 2021/167236 A1 | 8/2021 |

OTHER PUBLICATIONS

International Search Written Opinion dated Nov. 2, 2022 for PCT/KR2022/011503.

\* cited by examiner

ROLLABLE ELECTRONIC DEVICE

CROSS REFERENCE TO RELATED APPLICATIONS

This application is a continuation of International Application No. PCT/KR2022/011503, designating the United States, filed on Aug. 3, 2022, in the Korean Intellectual Property Receiving Office, claiming priority from Korean Patent Application No. 10-2021-0154567, filed on Nov. 11, 2021, which are hereby incorporated by reference for all purposes as if fully set forth herein.

BACKGROUND

Field

Certain example embodiments of the present disclosure relate to a rollable electronic device.

Description of Related Art

These days, electronic devices are gradually becoming slimmer in design, and are also improving to provide increased rigidity and strengthen design aspects, as well as service differentiated functions. Thus, electronic devices are changing from a uniform rectangular shape into a variety of shapes. An electronic device may have a deformable structure capable of using a large-screen display, while being convenient to carry. For example, as an example of such a deformable structure, the electronic device may have a structure (e.g., a rollable structure or a slideable structure) capable of changing a display area on a flexible display through the support of housings operating in a sliding manner with respect to each other. A rollable electronic device (or a slideable electronic device) may be configured such that the flexible display (or rollable display) can be rolled or unfolded. A slideable electronic device may be configured such that a screen can be expanded and contracted by moving the flexible display in a sliding manner.

SUMMARY

Regarding a technical problem, when an electronic device performs a pull-in operation from its open state, a bending member attached to a flexible display is drawn into a housing by the pressure applied to the bending member, so that its display area may be reduced. In the pull-in operation, the bending member may move in a direction opposite to a direction in which its part is drawn into the housing while force is applied in both directions with respect to a bending portion of a sliding frame. In such a case, as a gap between bars is compressed in the bending member positioned above the sliding frame, a so-called birdcaging phenomenon of the display may occur, and therefore, the display may lead to deteriorated performance.

Various example embodiments provide an electronic device having a bending member and a sliding frame capable of preventing occurrence of a birdcaging phenomenon of the flexible display during a pull-in (retracting) or pull-out (extracting) operation.

According to an example embodiment, there is provided an electronic device which may comprise a housing; a sliding frame, at least a portion of which is drawn out from the housing in a first direction during a pull-out operation, or at least a portion of which is retracted into the housing in a second direction opposite to the first direction during a pull-in operation, the sliding frame including a curved surface formed by bending at its side; a flexible display disposed in a space defined by the housing and the sliding frame, the flexible display including a first region visually visible from the outside, and a second region extending from the first region and varying in size depending on a pulled-in or pulled-out state of the sliding frame; and a bending member disposed on a rear surface of the flexible display, the bending member including a plurality of bars arranged in a certain interval to support the flexible display, wherein the bending member comprises a first bar including at least one first locking part protruding in an inner direction of the electronic device, among the plurality of bars, and wherein the sliding frame comprises at least one locking jaw configured to cause the at least one first locking part to be caught at a predetermined position in its open state.

According to various example embodiments, it is possible to prevent or reduce the likelihood of occurrence of a birdcaging phenomenon of the flexible display during the retracting or pulling-out operation of the sliding frame by using the locking part formed in the bending member and the locking jaw formed in the sliding frame.

BRIEF DESCRIPTION OF THE DRAWINGS

Certain example embodiments are illustrated in the accompanying drawings, throughout which like reference letters indicate corresponding parts in the various figures. The embodiments herein will be better understood from the following description with reference to the drawings, in which.

DETAILED DESCRIPTION

Hereinafter, various embodiments will be described in detail with reference to the accompanying drawings. Throughout the following description, specific details such as detailed configurations and components will be provided merely to help a general understanding of various embodiments of the disclosure. Accordingly, it will be apparent to those skilled in the art that various changes and modifications of the embodiments described herein can be made without departing from the scope and spirit of the disclosure. Further, descriptions of well-known functions and configurations may be omitted for clarity and conciseness.

Figure 1:
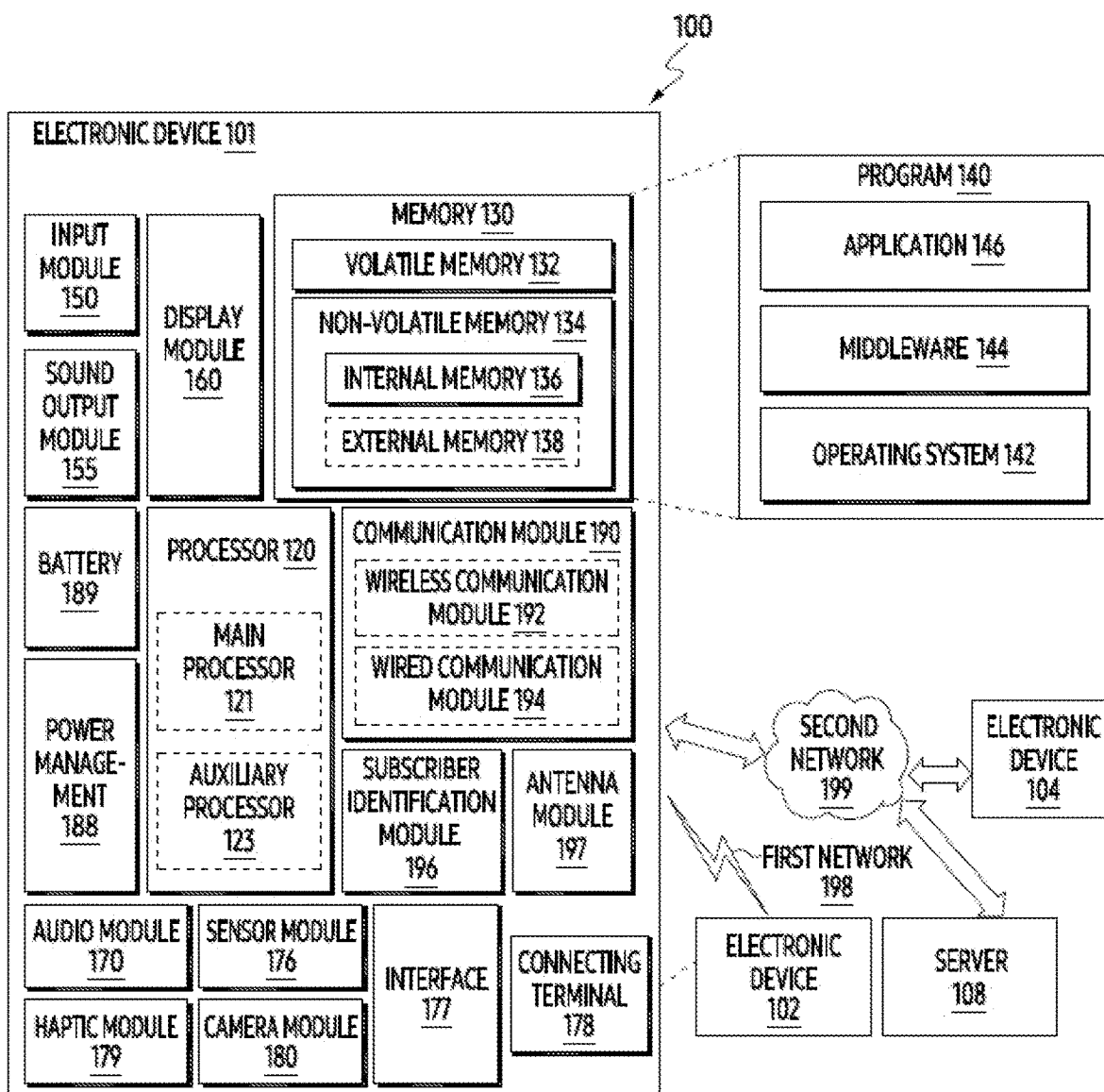
FIG. 1 is a block diagram of an electronic device in a network environment according to an example embodiment.

FIG. 1 is a block diagram of an electronic device in a network environment according to an embodiment.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134 (which may include internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may be a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
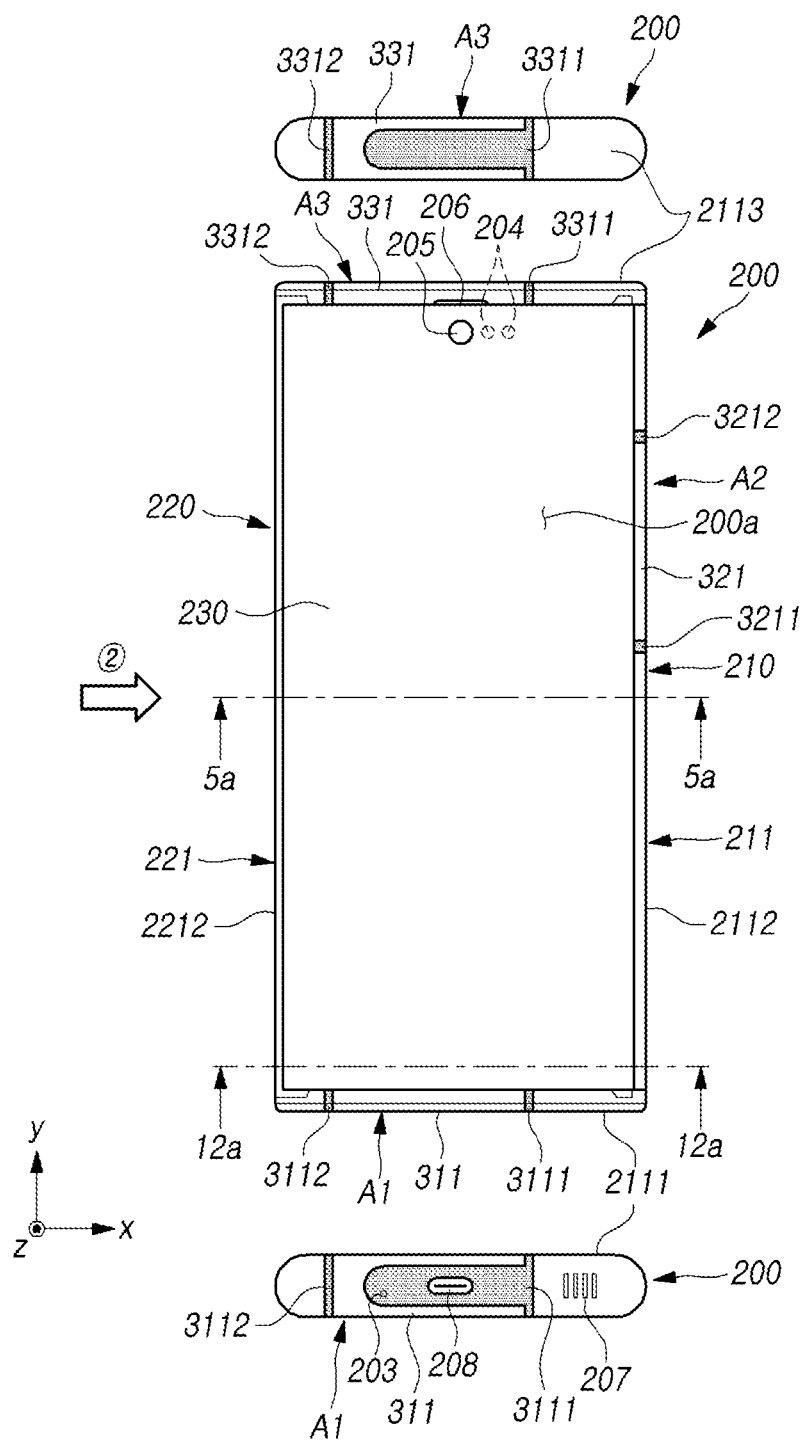
FIGS. 2A and 2B are front and rear views of an electronic device in a closed state according to an example embodiment.
Figure 2B:
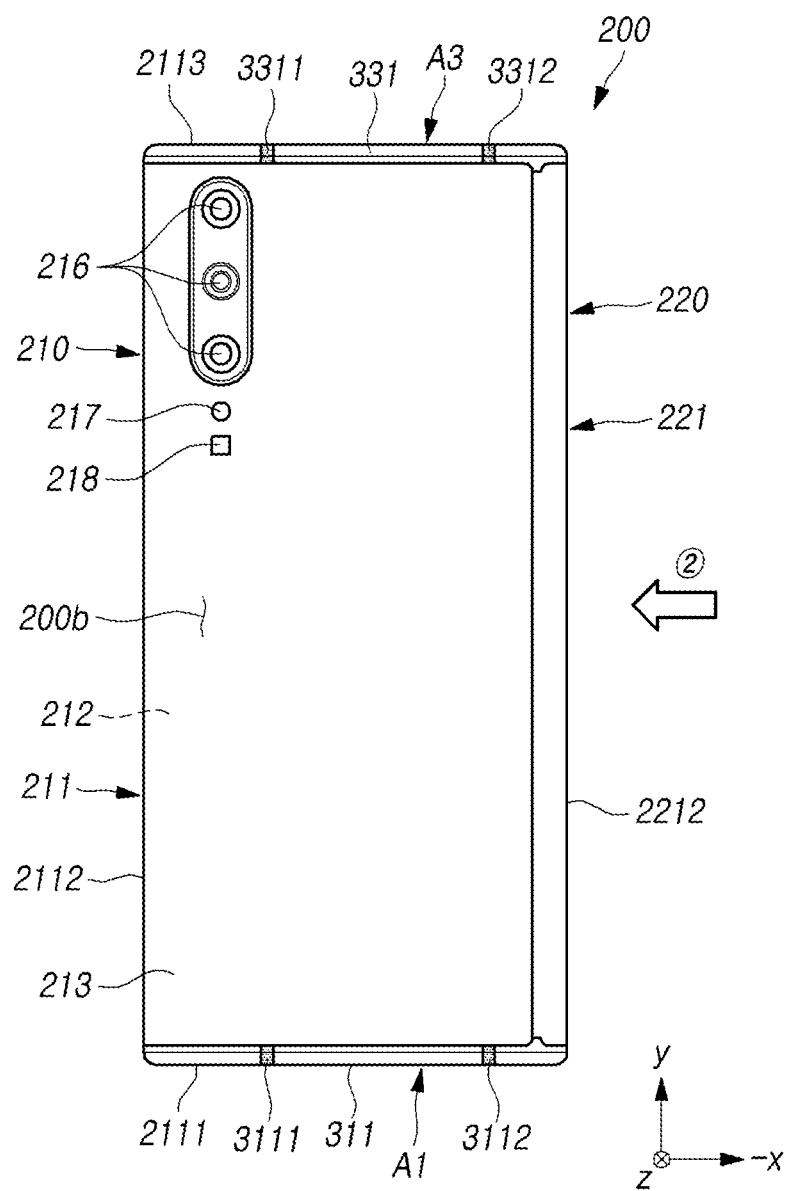
Figure 3A:
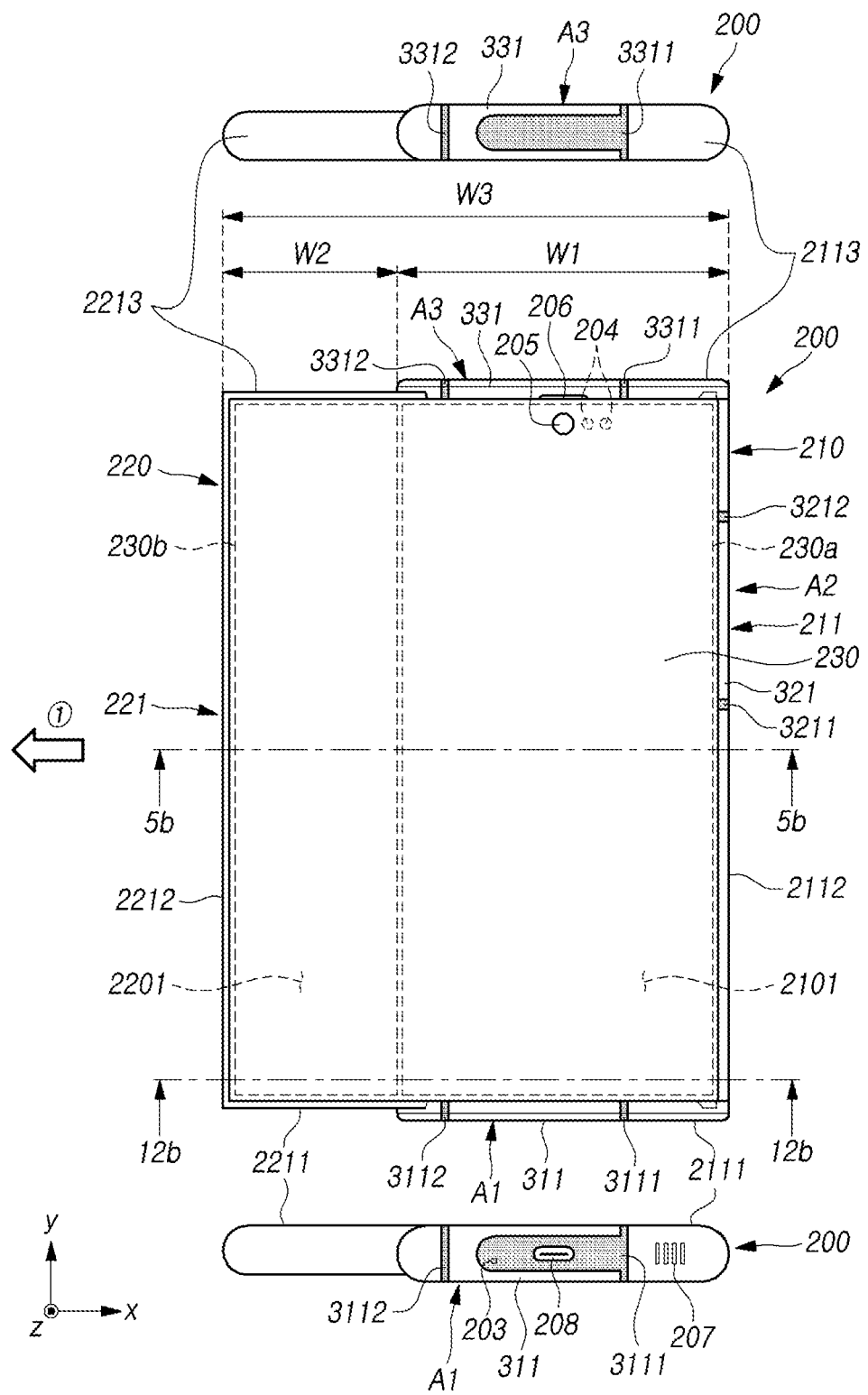
FIGS. 3A and 3B are front and rear views of an electronic device in an open state, according to an example embodiment.
Figure 3B:
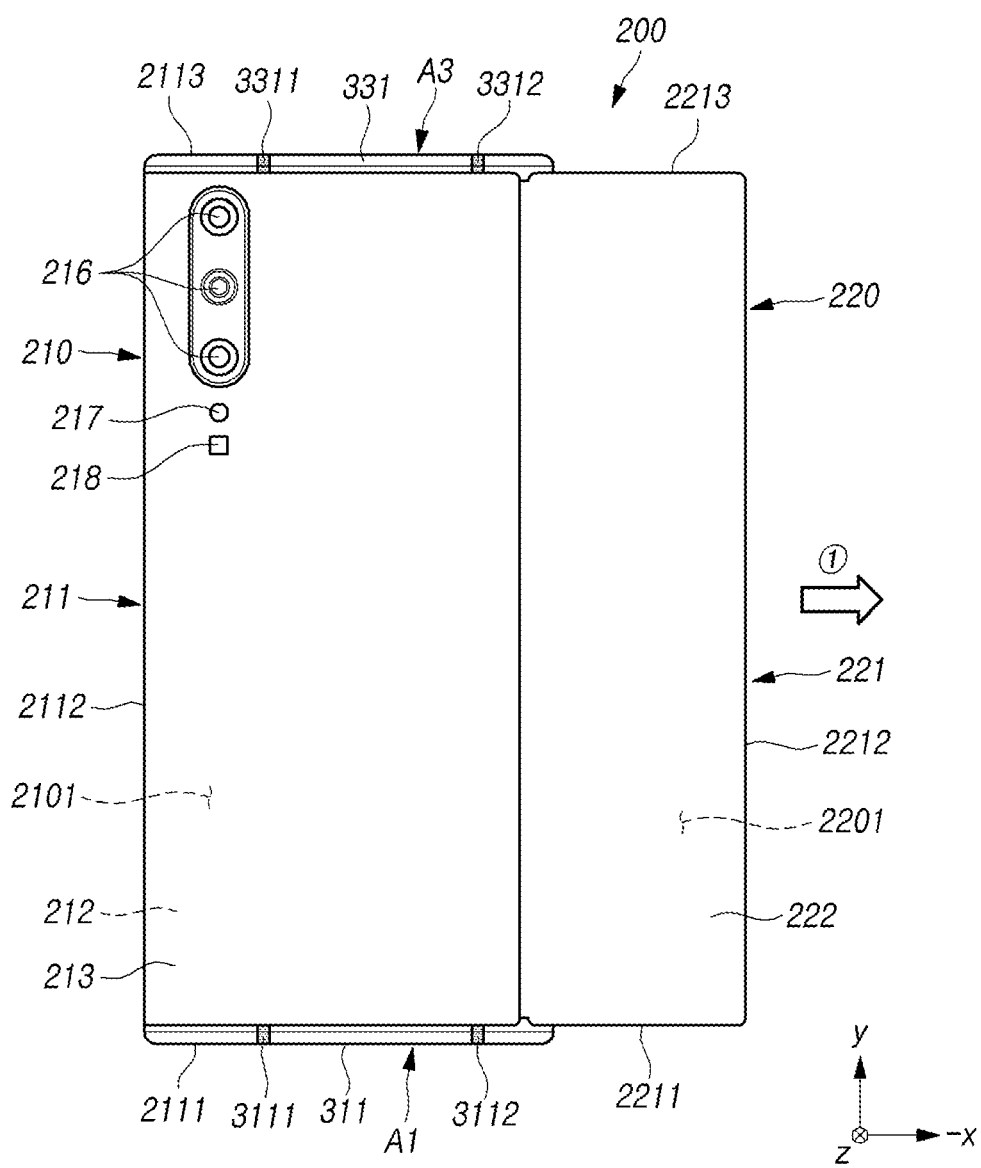

FIGS. 2A and 2B are front and rear views of an electronic device in a closed state according to an embodiment. FIGS. 3A and 3B are front and rear views of an electronic device in an open state according to an embodiment.

According to an embodiment, the electronic device 200 of FIGS. 2A to 3B may be at least partially similar to the electronic device 101 of FIG. 1 or may further include other embodiments of the electronic device.

Referring to FIGS. 2A to 3B, the electronic device 200 may include a flexible display 230 (e.g., expandable display, stretchable display, rollable display, or display assembly) (such as, e.g., the display module 160 of FIG. 1) in which at least two housings are stacked in a vertical direction to enable sliding in a certain direction. The flexible display 230 may be configured so that its display area changes as one housing slides along another housing in a certain direction, for example. According to an embodiment, the electronic device 200 may include a first housing 210 (e.g., a first housing structure or a base housing), a second housing 220 (e.g., a second housing structure or a slide housing) movably coupled within a designated distance from the first housing 210 in a designated direction (e.g., an x-axis direction), and a flexible display 230 arranged to be supported through at least a portion of the first housing 210 and the second housing 220.

According to an embodiment, the electronic device 200 can switch from an open state to a closed state as at least a portion of the second housing 220 is accommodated in a first receiving part 2101 of the first housing 210. The electronic device 200 may switch from the closed state to the open state as the at least a portion of the second housing 220 accommodated in the first receiving part 2101 is drawn out of the first receiving part 2101. As disclosed herein, the open state may refer to a state in which the second region 230b of the flexible display 230 is maximized, and the closed state may refer to a state in which the second region 230b of the flexible display 230 is minimized.

According to an embodiment, the electronic device 200 may include a bending member or bendable support member (e.g., a bending member 240 of FIG. 4) such as e.g., an articulated hinge module or a bar assembly. In the open state, the bending member may at least partially form the same plane as at least a portion of the first housing 210. In the closed state, the bending member may be at least partially accommodated in the second receiving part 2201 of the second housing 220.

According to an embodiment, the electronic device 200 may operate so that the second housing 220 is slidably moved from the first housing 210 in a designated direction (e.g., an x-axis direction) to enable the display area of the flexible display 230 to vary.

According to an embodiment, the display area of the flexible display 230 may change depending upon a pull-in operation or a pull-out operation. The flexible display 230 may, for example, perform the pull-in operation or the pull-out operation by an external force (e.g., a user's manipulation) or an internal force (e.g., an operation by a driving module 400 of FIG. 4). The pull-in operation may include a series of operations for reducing the size of the display area by the flexible display 230. The pull-out operation may include a series of operations for expanding the size of the display area by the flexible display 230. Hereinafter, for convenience of explanation, a state in which the display area of the flexible display 230 is maximized or enlarged by a pull-out operation is referred to as an 'open state', and a state in which the display area of the flexible display 230 is minimized or reduced by a pull-in operation is referred to as a 'closed state'. Throughout the following description, for convenience of description, the state of the flexible display 230 before the pull-in operation or the pull-out operation is initiated is referred to as a first state or an initial state, and the state of the flexible display 230 after the pull-in operation or the pull-out operation is completed is referred to as a second state or a transition state. In the pull-in operation, the first state may be referred to as a first pull-out state to indicate that it is in a state before the pull-in operation is started, and the second state may be referred to as a first pull-in state to indicate that it is in a state after the pull-in operation is completed. Further, in the pull-out operation, the first state may be referred to as a second pull-in state to indicate that it is in a state before the pull-out operation is started, and the second state may be referred to as a second pull-out state to indicate that it is in a state after the pull-out operation is completed.

Figure 4:
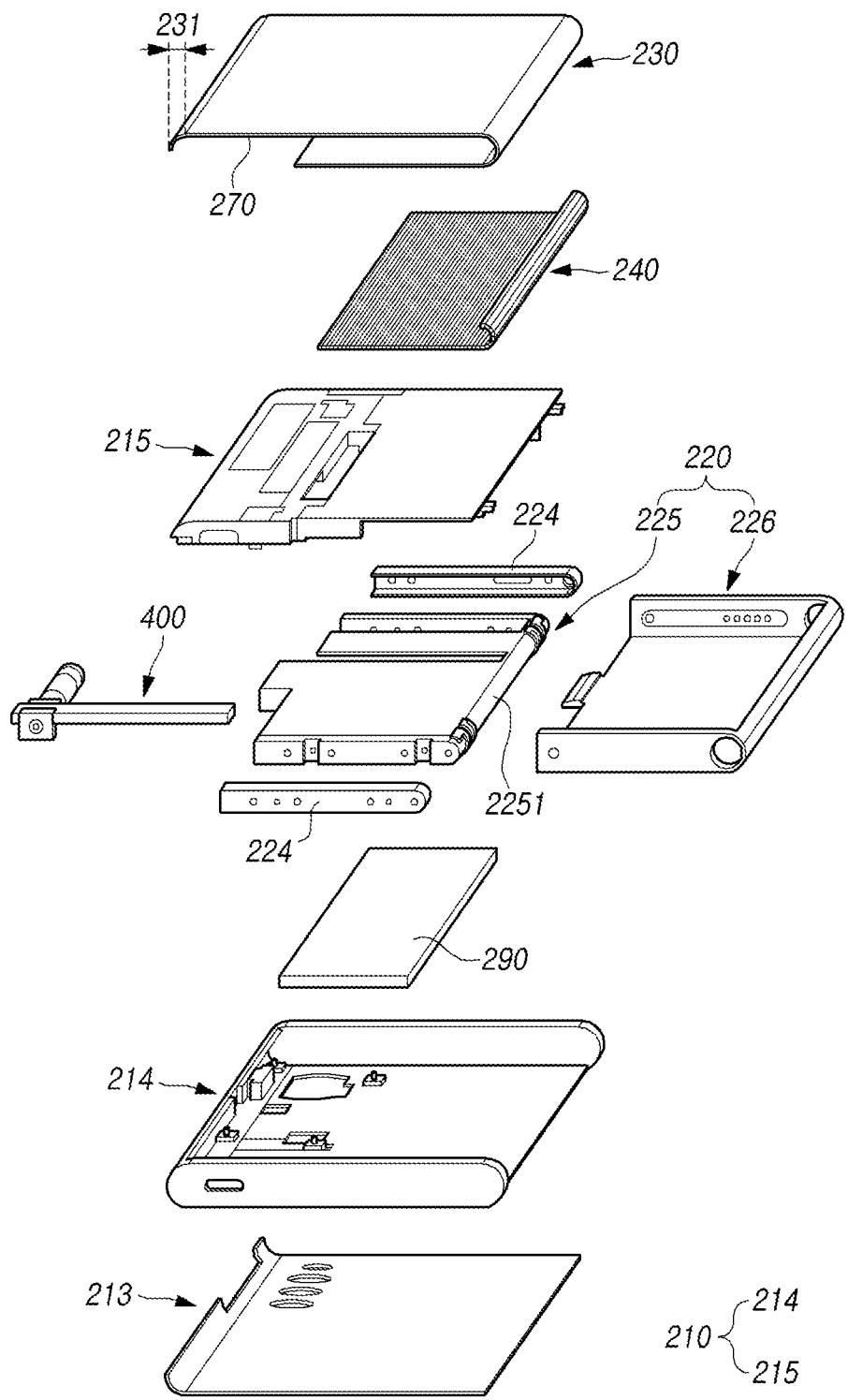
FIG. 4 is an exploded perspective view of an electronic device according to an example embodiment.

According to an embodiment, the flexible display 230 may be disposed so that a first region corresponding to at least a part thereof is not accommodated in the first receiving part 2101 of the first housing 210 or a second receiving part 2201 of the second housing 220, being supported by the bending member (e.g., the bending member 240 of FIG. 4). The first region of the flexible display 230 drawn out from the receiving part (e.g., the first receiving part 2101 or the second receiving part 2201) may be disposed to be visible from the outside (e.g., the front side). The first region may include an edge (e.g., an edge 231) of the display. The flexible display 230 may be accommodated in the first receiving part 2101 of the first housing 210 or the second receiving part 2201 of the second housing 220, with a second region corresponding to at least a portion of the flexible display 230 being supported by the bending member (e.g., the bending member 240 of FIG. 4). The second region of the flexible display 230 accommodated in the receiving part (e.g., the first receiving part 2101 or the second receiving part 2201) may be disposed to be invisible from the outside or to be visible only from its back side instead of its front side. The first region may be expanded by the pull-out operation or reduced by the pull-in operation. The second region may be reduced by the pull-out operation or may be expanded by the pull-in operation. The display area of the first region and the second region may vary depending on how much they are drawn out or drawn in (e.g., a ratio of the first region to an entire region or the second region to the entire region). The edge (e.g., the edge 231 in FIG. 4) of the display may maintain a constant area regardless of the pull-in operation or the pull-out operation. The first region may be used, for example, to display an image according to an operation of the electronic device 200 on the front part. The second region may be, for example, deactivated so that the electronic device 200 cannot be used to display an image according to an operation, or may be activated so that the electronic device 200 can be used to display an image according to an operation on the rear side. The second region may be activated to be used to display an image according to an operation of the electronic device 200 only for a portion from which at least a portion thereof is drawn out and is visible from the outside. The bending member may be, for example, disposed to form at least partially the same plane as the first housing 210.

According to an embodiment, the electronic device 200 may have a front surface 200*a* (e.g., a first surface), a rear surface 200*b* (e.g., a second surface) facing in a direction opposite to the front surface 200*a*, and a side (not shown) surrounding a space between the front surface 200*a* and the rear surface 200*b*. The side may include at least one of an upper side, a lower side, a left side, or a right side, with respect to the front surface. However, this arrangement is only for an example, and a first side member 211 and a second side member 221 may have surfaces corresponding to one or two surfaces of four surfaces of the first housing 210 and the second housing 220. Hereinafter, for convenience of description, a circumstance of three surfaces will be described as an example.

According to an embodiment, the electronic device 200 may include a first housing 210 and a second housing 220. The first housing 210 may include a first side member 211. The second housing 220 may include a second side member 221. The first side member 211 may form, for example, edges corresponding to at least three surfaces (e.g., an upper side, a lower side, and a right side with respect to the front surface) among the four surfaces of the first housing 210. The second side member 221 may, for example, form edges corresponding to at least three surfaces (e.g., an upper side, a lower side and a left side with respect to the front surface) among the four surfaces of the second housing 220.

According to an embodiment, the first side member 211 may include at least one of a first side 2111 (e.g., a lower side of the first housing 210), a second side 2112 (e.g., a right side of the first housing 210), and a third side 2113 (e.g., an upper side of the first housing 210). The first side 2111 may have a first length along a first direction (e.g., x-axis direction). The second side 2112 may extend to have a second length longer than the first length in a direction substantially perpendicular to the first side 2111 (e.g., y-axis direction). The third side 2113 may extend substantially parallel to the first side 2111 from the second side 2112 and may have the first length. The first side member 211 may be, for example, at least partially formed of a conductive material (e.g., metal). The first side member 211 may include, for example, a first support member 212 extending to at least a portion of the first receiving part 2101 of the first housing 210.

According to an embodiment, the second side member 221 may include at least one of a fourth side 2211 (e.g., a lower side of the second housing 220), a fifth side 2212 (e.g., a left side of the second housing 220) or a sixth side 2213 (e.g., an upper side of the second housing 220). The fourth side 2211 may at least partially correspond to the first side 2111 and may have a third length. The fifth side 2212 may extend in a direction substantially parallel to the second side 2112 from the fourth side 2211 and may have a fourth length greater than the third length. The sixth side 2213 may extend from the fifth side 2212 to correspond to the third side 2113 and may have the third length. The second side member 221 may be, for example, at least partially formed of a conductive material (e.g., metal). The second side member 221 may include, for example, a second support member 222 extending to at least a portion of the second receiving part 2201 of the second housing 220.

According to an embodiment, the first side 2111 and the fourth side 2211 or the third side 2113 and the sixth side 2213 may be slidably coupled to each other. In this context, in the closed state, a part or all of the fourth side 2211 may be arranged to overlap the first side 2111, so that it may be disposed to be substantially invisible from the outside. Further, in the closed state, a part or all of the sixth side 2213 may be arranged to overlap the third side 2113, so that it may be disposed to be substantially invisible from the outside. For example, the fourth side 2211 or the sixth side 2213 may be arranged to be at least partially visible from the outside, in the closed state.

According to an embodiment, in a pull-in operation, the second support member 222 included in the second side member 221 may overlap the first support member 212 included in the first side member 211 to be arranged substantially invisible from the outside. For example, when the pull-in is not fully made, a portion of the second support member 222 may overlap the first support member 212 to be invisible from the outside, and the rest of the second support member 222 may not overlap the first support member 212 to be disposed to be viewed from the outside.

According to an embodiment, the electronic device may include a rear cover 213. The rear cover 213 may be disposed on at least a portion of the first housing 210 on the rear surface 200b of the electronic device. The rear cover 213 may be, for example, disposed through at least a portion of the first support member 212. The rear cover 213 may be formed integrally with the first side member 211, for example. The rear cover 213 may be formed of, for example, a polymer, coated or colored glass, ceramic, metal (e.g., aluminum, stainless steel (STS), or magnesium), or a combination of at least two of these materials. The rear cover 213 may extend, for example, to at least a portion of the first side member 211. At least a portion of the first support member 212 may be replaced with, for example, the rear cover 213. In the second housing 220, the electronic device 200 may further include another rear cover (e.g., a second rear cover) disposed on at least a portion of the second support member 222, or replaced with at least the portion of the second support member 222.

According to an embodiment, the electronic device 200 may include a flexible display 230 disposed to be supported by at least a portion of the first housing 210 or the second housing 220. The flexible display 230 may include a first region 230a (e.g., a flat portion) and/or a second region 230b (e.g., a curved portion, a bendable portion, or a rollable portion). The first region 230a may be an area that is always visible from the outside of the entire area of the flexible display 230. The second region 230b, which may extend from the first region 230a, may be a region that is, in the pull-in operation, accommodated in the first receiving part 2101 of the first housing 210 or the second receiving part 2201 of the second housing 220 to be invisible from the outside, and is, in the pull-out operation, drawn out from the first receiving part 2101 or the second receiving part 2201 to be visible from the outside. The first region 230a may be disposed to be supported by the first housing 210. The second region 230b may be disposed to be at least partially supported by the bending member (e.g., the bending member 240 of FIG. 4). For the aforementioned activated region, the region pulled out from the first receiving part 2101 or the second receiving part 2201 of the first region 230a or the second region 230b may be activated to display an image thereon, and the region accommodated in the first receiving part 2101 or the second receiving part 2201 of the second regions 230b may be inactivated to display no image thereon.

According to an embodiment, in the pulled-out state of the second housing 220 along a designated direction (e.g., in the direction indicated by an arrow ①), the second region 230b of the flexible display 230 may be extended from the first region 230a, being supported by the bending member (e.g., the bending member 240 of FIG. 4). To this end, the second region 230b may form substantially the same plane as that of the first region 230a and may be disposed to be visible from the outside.

According to an embodiment, in the pulled-in state of the second housing 220 along a designated direction (e.g., in the direction indicated by an arrow ②), the second region 230b of the flexible display 230 may be accommodated in the second receiving part 2201 of the second housing 220, and it may be arranged to be invisible from the outside, or to be viewed from the back rather than from the front.

According to an embodiment, an opposite end of a variable portion (e.g., the second region 230b) of the flexible display 230 may include a fixing part (e.g., the edge 231) fixed by the first housing 210. The fixing part (e.g., the edge 231) may be formed by, for example, bending from one side of the flexible display 230 toward a side (e.g., the second side 2112) of the first housing 210. The fixing part (e.g., the edge 231) may form a part or all of the side (e.g., the second side 2112) of the first housing 210. Each embodiment herein may be used in combination with any other embodiment(s) herein.

According to an embodiment, the first housing 210 and/or the second housing 220 may operate in a sliding manner so that the overall width changes with respect to each other. For example, in a closed state, the electronic device 200 may be configured to have a first width W1 between the second side 2112 and the fifth side 2212. Further, in an open state, the electronic device 200 may be moved so that at least a portion of the bending member (e.g., the bending member 240 of FIG. 4) accommodated in the second receiving part 2201 of the second housing 220 has an additional second width W2, thereby enabling to have a third width W3 greater than the first width W1. The flexible display 230 included in the electronic device 200 may have, in the closed state, a display area substantially corresponding to the first width W1, and may have, in the open state, an expanded display area substantially corresponding to the third width W3.

According to an embodiment, the pull-in and/or pull-out operations of the electronic device 200 may be carried out automatically. The electronic device 200 may, for example, receive a request for the pull-in and/or pull-out operation to operate a driving module (e.g., the driving module 400 of FIG. 4) included therein. The request for the pull-in or pull-out operation may be made by a designated manipulation button disposed on the electronic device 200 and/or a touch motion onto a corresponding object displayed on the flexible display 230. For example, when the processor of the electronic device 200 (e.g., the processor 120 of FIG. 1) detects a pull-in and/or pull-out event, it may operate to control a sliding operation of the second housing 220 through the driving module 400. The processor (including processing circuitry) of the electronic device 200 (e.g., the processor 120 of FIG. 1), in response to a change in the display area of the flexible display 230, for example, in a closed state, an open state, or an intermediate state (e.g., inclusive of a free stop state), may operate to display an object in various ways or control the display screen of the flexible display 230 to execute an application program.

According to an embodiment, the electronic device 200 may include at least one of an input device (e.g., a microphone 203) disposed in the first receiving part 2101 of the first housing 210, a sound output device (e.g., a receiver 206 or a speaker 207 for phone calls), a sensor module 204 or 217, a camera module (e.g., a first camera module 205 or a second camera module 216), a connector port 208, a key input device (not shown), and an indicator (not shown). The electronic device 200 may be configured such that at least one of the above-described components is omitted or other components are added thereto. At least one of the above-described components may be disposed in the second receiving part 2201 of the second housing 220. Each "module" herein may comprise circuitry.

According to an embodiment, the input device may include a plurality of microphones disposed to detect a direction of sound. The sound output device may include, for example, a receiver 206 and a speaker 207 for phone calls. The speaker 207 may be disposed to face the outside through at least one speaker hole formed in the first housing 210, in the open state. The connector port 208 may be disposed to face the outside through a connector port hole formed in the first housing 210, in the open state. The receiver 206 for phone calls may include a speaker (e.g., a piezo speaker) operating with the separate speaker hole being excluded.

According to an embodiment, the sensor modules 204 and 217 (comprising sensors, respectively) may generate an electrical signal or data value corresponding to an internal operating state of the electronic device 200 or an external environmental state. The sensor modules 204 and 217 may include a first sensor module 204 (e.g., a proximity sensor or an illuminance sensor) disposed on the front surface 200a of the electronic device 200 and/or a second sensor module 217 (e.g., a heart rate monitoring (HRM) sensor) arranged on the rear surface 200b of the electronic device 200. The first sensor module 204 may be, for example, disposed underneath the flexible display 230, in the front surface 200a of the electronic device 200. The first sensor module 204 and/or the second sensor module 217 may include at least one of a proximity sensor, an illuminance sensor, a time of flight (ToF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor and so on.

According to an embodiment, the camera module may include a first camera module 205 disposed at the front surface 200a of the electronic device 200, and a second camera module 216 disposed at the rear surface 200b of the electronic device 200. The first and/or second camera modules 205 and 216 may include one or more lenses, an image sensor, and/or an image signal processor. For example, the first camera module 205 may be disposed underneath the flexible display 230 and may be configured to capture a subject through a portion of an activated area of the flexible display 230. A flash 218 may be disposed in the second camera module 216. The flash 218 may include, for example, a light emitting diode or a xenon lamp.

According to an embodiment, the first camera module 205 of the camera modules or some sensor module(s) 204 of the sensor modules 204 and 217 may be arranged to detect the external environment through the flexible display 230. For example, the first camera module 205 or some sensor module(s) 204 may be arranged, in the first receiving part/portion 2101 of the first housing 210, to come into contact with the external environment through a transmissive area or a perforated opening formed in the flexible display 230. The region of the flexible display 230 facing the first camera module 205 may include a transmissive region with a designated transmittance as a part of a content display region. The transmissive region may be formed to have, for example, a predetermined transmittance in a range of about 5% to about 20%. This transmission region may include a region overlapping an effective region (e.g., an angle of view region) of the first camera module 205, through which light is formed into image when passing through an image sensor for obtaining an image. For example, the transmissive area of the flexible display 230 may include an area having lower pixel density and/or wiring density than its surrounding area. The transmissive area may replace the opening. The camera module 205 may include an under display camera (UDC). The sensor module 204 may be disposed to perform its function without being visually exposed through the flexible display 230 in the internal space of the electronic device 200.

According to embodiments, the electronic device 200 may include at least one antenna (e.g., antenna radiators A1, A2 and A3) electrically connected with a wireless communication circuitry (e.g., the wireless communication module 192 of FIG. 1) disposed in the first receiving part 2101 of the first housing 210. The at least one antenna (A1, A2 and A3) may include at least one of a first antenna A1 disposed on the first side 2111, a second antenna A2 disposed on the second side 2112, or a third antenna A3 disposed on the third side 2113 in the first housing 210. The electronic device 200 may further include at least one antenna disposed on the fifth side 2212 in the second housing 220.

According to an embodiment, in the electronic device 200, the first antenna A1 may include a first conductive portion 311 segmented through at least one segment 3111 and 3112, which is a non-conductive portion, in the first side 2111 of the first side member 211. The first conductive portion 311 may be, for example, arranged to be segmented through a first segment 3111 and/or a second segment 3112 spaced apart at a predetermined interval from each other, and may be electrically connected to the wireless communication circuitry (e.g., the wireless communication module 192 of FIG. 1).

According to an embodiment, in the electronic device 200, the second antenna A2 may include a second conductive portion 321 segmented through at least one segment 3211 and 3212, which is a non-conductive portion, in the second side 2112 of the first side member 211. The second conductive portion 321 may be, for example, arranged to be segmented through a third segment 3211 and/or a fourth segment 3212 spaced apart at a predetermined interval from each other, and may be electrically connected to the wireless communication circuitry (e.g., the wireless communication module 192 of FIG. 1).

According to an embodiment, in the electronic device 200, the third antenna A3 may include a third conductive portion 331 segmented through at least one segment 3311 and 3312, which is a non-conductive portion, in the third side 2113 of the first side member 211. The third conductive portion 331 may be, for example, arranged to be segmented through a fifth segment 3311 and/or a sixth segment 3312 spaced apart at a predetermined interval from each other, and may be electrically connected to the wireless communication circuitry (e.g., the wireless communication module 192, including communication circuitry, of FIG. 1).

According to an embodiment, in the electronic device 200, the wireless communication circuitry (e.g., the wireless communication module 192 of FIG. 1) may be configured to transmit and/or receive a wireless signal in a designated first frequency band (e.g., about 800 MHz to about 6000 MHZ) through the first conductive portion 311, the second conductive portion 321 and/or the third conductive portion 331. In the electronic device 200, the wireless communication circuitry (e.g., the wireless communication module 192 of FIG. 1) may be configured to transmit and/or receive a wireless signal in a designated second frequency band (e.g., about 3 GHz to about 100 GHz). The electronic device 200 may further include at least one antenna module for transmitting and/or receiving a signal in the first frequency band or at least one additional antenna module for transmitting and/or receiving a signal in the second frequency band (e.g., 5G antenna module or antenna structure).

According to various embodiments of the disclosure, the electronic device 200 may include a driving module (e.g., the driving module 400 of FIG. 4) in its internal space for the pull-in and/or pull-out operation. The driving module 400 may be disposed in the internal space of the electronic device 200 in consideration of the physical relationship with other electronic components, thereby helping to slim the electronic device 200.

Figure 5A:
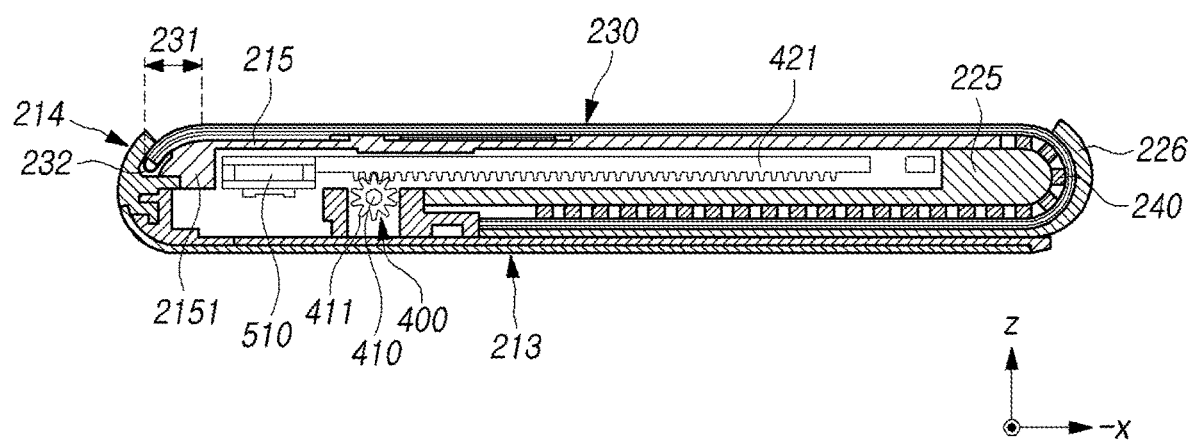
FIG. 5A is a cross-sectional view of an electronic device taken along a line 5a-5a of FIG. 2A according to an example embodiment.

FIG. 4 is an exploded perspective view of an electronic device (e.g., the electronic device 200 of FIGS. 2A to 3B) according to an embodiment. FIG. 5A is a cross-sectional view of the electronic device (e.g., the electronic device 200 of FIGS. 2A to 3B) as viewed along a line 5a-5a of FIG. 2A, according to an embodiment. Further, FIG. 5B is a cross-sectional view of the electronic device (e.g., the electronic device 200 of FIGS. 2A to 3B) as viewed along a line 5b-5b of FIG. 3A, according to an embodiment.

Figure 5B:
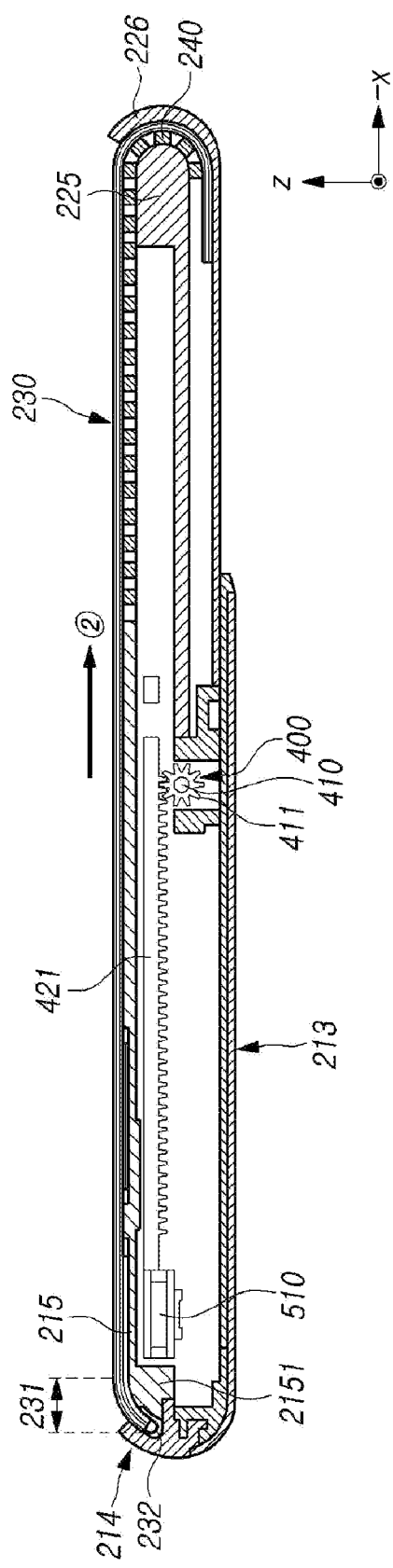
FIG. 5B is a cross-sectional view of an electronic device taken along a line 5b-5b of FIG. 3A according to an example embodiment.

Referring to FIGS. 4 to 5B, the electronic device 200 may have a predetermined bar (e.g., a first bar 2411) in which a locking part (e.g., a first locking part 2411a of FIG. 6) is formed to prevent or reduce the likelihood of the display from birdcaging that may occur in a bendable portion (e.g., the second portion W2 of FIG. 3A) during the pull-in and/or pull-out operation of the flexible display 230. According to an embodiment, the electronic device 200 may have a locking jaw (e.g., a first locking jaw 2252a in FIG. 10) corresponding to the locking part (e.g., the first locking part 2411a), formed on a side (e.g., a side 2253 of FIG. 9A) of a sliding frame 225 of the second housing 220.

According to an embodiment, the electronic device 200 may include a first housing 210 including a first receiving part 2101, a second housing 220 including a second receiving part 2201, a bending member 240 (e.g., a bar assembly), or a flexible display 230. The first housing 210 may be slidably coupled to the second housing 220. The bending member 240 may be at least partially rotatably disposed in the second receiving part 2201. The flexible display 230 may be disposed to be supported by at least a portion of the bending member 240 and the first housing 210.

According to an embodiment, the first housing 210 may include at least one of a cover housing 214 or a bracket housing 215. The first housing 210 may be provided, for example, by coupling of the cover housing 214 and the bracket housing 215. At least a portion of the cover housing 214 may include a first support member (e.g., the first support member 212 of FIG. 3B), or may be replaced with the first support member (e.g., the first support member 212 of FIG. 3B). The bracket housing 215 may include a first surface 2151 facing a second direction (e.g., z-axis direction), a second surface 2152 facing a third direction (e.g., −z-axis direction) opposite to the first surface 2151, and a side 2153 surrounding between the first surface 2151 and the second surface 2152. According to an embodiment, the electronic device 200 may be disposed on at least a portion of the first surface 2151 of the bracket housing 215 under the flexible display 230, and thus include an auxiliary cover that provides a flat surface.

According to an embodiment, the electronic device 200 may include at least one battery 290 or a substrate 510 disposed in the first receiving portion 2101 between the second surface 2152 of the bracket housing 215 and the cover housing 214. The substrate 510 or the at least one battery 290 may be attached to the bracket housing 215.

According to an embodiment, the electronic device 200 may include at least one of a sensor module (e.g., the sensor module of FIG. 3A) or a camera module (e.g., the camera module 216 of FIG. 3B) disposed in the first receiving part 2101.

According to an embodiment, the bending member 240 may be attached to at least a portion of the rear surface of the flexible display 230. The front surface 243 of the bending member 240 may come into contact with the rear surface of the flexible display 230. The bending member 240 may include a plurality of bars 241 supporting the flexible display 230. The plurality of bars 241 may be disposed to be spaced apart from each other by a predetermined interval. At least a portion of the bending member 240 may be accommodated to be movable in the second receiving part 2201 of the second housing 220. The bending member 240 may be at least partially accommodated in the second receiving part 2201, in its closed state. The bending member 240 may, in its open state, be at least partially drawn out from the second receiving part 2201 so as to form a plane substantially flush with the first housing 210 (e.g., the bracket housing 215). The flexible display 230 supported by at least a portion of the bending member 240 or the first housing 210 may have the viewable display area, varying depending on the sliding motion.

According to one embodiment, at least one bar 241 of the plurality of bars 241 of the bending member 240 may be provided with a locking part (e.g., the first locking part 2411a). The locking part (e.g., the first locking part 2411a) may be formed to protrude toward the rear side 244 of the bending member 240. In more detail, the locking part (e.g., the first locking part 2411a) may be formed to protrude inwards of the electronic device 200, when the bending member 240 is assembled to the electronic device 200. The flexible display 230 may be, in the pull-out operation, drawn out until the locking portion (e.g., the first locking part 2411a) is caught onto the locking jaw (e.g., the first locking jaw 2252a in FIG. 10) formed in the second housing 220 (e.g., the sliding frame 225). The locking jaw (e.g., the first locking jaw 2252a in FIG. 10) may serve as a stop guide so that the bending member 240 can stop when the flexible display 230 is pulled out to reach its open state (or the second pull-out state).

According to an embodiment, the electronic device 200 may include a guide rail 224 disposed between the first housing 210 and the second housing 220 to induce a sliding operation of the second housing 220. The guide rail 224 may be integrally formed with the second housing 220 (e.g., the sliding frame 225 or the slide cover housing 226). The guide rail 224 may guide the movement of the bending member 240. According to an embodiment, the electronic device 200 may further include a side cover (now shown) disposed to cover both sides (e.g., the first side 2111 and the third side 2113 of FIG. 2B) of the first housing 210.

According to an embodiment, the second housing 220 may include a sliding frame 225 or a slide cover housing 226. The sliding frame 225 may be disposed to be at least partially movable from the first housing 210 towards the second receiving part 2201 (e.g., in the direction indicated by the arrow ①). In one example, the sliding frame 225 may be coupled to the slide cover housing 226 and may be slidably coupled to the first housing 210 (e.g., the bracket housing 215). As another example, the sliding frame 225 may be integrally formed with the slide cover housing 226. When the structure of the sliding frame 225 is included in the slide cover housing 226, then the sliding frame 225 may not be incorporated as a separate component.

According to an embodiment, the electronic device 200 may include a driving module 400. The driving module 400 may be disposed in the internal space (e.g., the first receiving part 2101 or the second receiving part 2201). The driving module 400 may provide a driving force for moving the second housing 220 in a direction in which the second housing 220 is drawn out from the first housing 210 (e.g., the direction ①) and/or in a direction in which it is drawn in the first housing 210 (e.g., the direction ②). The driving module 400 may be disposed, for example, in the second housing 220 (e.g., the sliding frame 225).

According to an embodiment, the driving module 400 may include a driving motor 410, a first gear 411 (e.g., a pinion gear) mounted on the driving motor 410, and a second gear 421 (e.g., a rack gear) meshed with the first gear 411. The driving motor 410 may move along with the sliding frame 225 in the pull-in and/or pull-out operation of the electronic device 200.

According to an embodiment, the driving module 400 may be disposed in the sliding frame 225 to be positioned on the same plane as the sliding frame 225. The driving module 400 enables relative reduction in thickness of the electronic device 200, thereby assisting in further slimming thereof, compared to the driving module 400 disposed above or beneath the sliding frame 225.

According to an embodiment, the electronic device 200 may induce the pull-in operation or the pull-out operation by linear motion of the second gear 421 as the driving motor 410 is driven. Specifically, the second gear 421 may be caused to push a part of the first housing 210 or an electronic component within the first receiving part 2101 to move the sliding frame 255 in the direction ② (e.g., −x-axis direction), thereby enabling pulling-out of the flexible display 230.

According to an embodiment, a bending plate 270 may be attached to the rear surface of the flexible display 230. The rear surface of the flexible display 230 may indicate a surface located opposite to the surface from which light is emitted from a display panel including a plurality of pixels. The bending plate 270 may contribute to durability of the flexible display 230. The bending plate 270 may reduce the effect of a load or stress that may occur when the flexible display 230 is pulled in/out, on the flexible display 230. The bending plate 270 may prevent or reduce a chance of the flexible display 230 from being damaged by a force transmitted therefrom upon movement of the sliding frame 225.

According to an embodiment, the bending plate 270 may be formed of various metal materials and/or non-metal materials (e.g., polymer). The bending plate 270 may include, for example, stainless steel. The bending plate 270 may include, for example, engineering plastic. The bending plate 270 may be implemented integrally with the flexible display 230.

According to an embodiment, the bending plate 270 may be arranged so that the electronic components (e.g., the bending member 240) disposed inside the electronic device 200 is substantially invisible through the flexible display 230 from the outside.

According to an embodiment, bending plate 270 may be provided with a touch panel or a pen recognition panel. The touch panel may detect a user's finger gesture input and output a touch event value corresponding to the detected touch input signal. The touch panel may be implemented in one of a capacitive type or a pressure sensitive type. Here, the capacitive type of touch panel uses detecting micro-electricity generated in the user's body to calculate touch coordinates. Further, the pressure-sensitive type of touch panel has at least two electrode plates therein and uses detecting a current flow caused by contacting of the upper/lower plates at a touched point to calculate touch coordinates. The pen recognition panel may detect the user's pen gesture input accruing from the user's manipulation of a touch pen (e.g., a stylus pen or a digitizer pen), and then output a pen proximity event value or a pen touch event value. The pen recognition panel may be implemented by, for example, an EMR (Electro-Magnetic Resonance) method, and may sense a touch or proximity input depending on proximity of the touch pen or a change in strength of an electromagnetic field due to a touch.

According to an embodiment, the flexible display 230 may further include an extension 232 configured to extend from a fixed part (e.g., an edge 231). The extension 232 may be, for example, bent with a certain curvature, and electrically connect a flexible printed circuit board (FPCB) (not shown) and a display driving chip located on the rear surface of the flexible display 230. The display driving chip may be provided, for example, on the extension 232.

The extension 232 may be implemented with, for example, either one of a chip-on-film (COF) method or a chip-on-plastic (COP) method, but the present invention is not limited thereto.

The chip-on-film method adopts mounting a display driving chip on a film base connecting a display glass substrate and a flexible printed circuit board. When the extension 232 is prepared by the chip-on-film method, the extension 232 may be electrically connected to the flexible printed circuit board based on anisotropic conductive film (ACF) bonding. Here, the ACF may be of an anisotropic conductive film in which fine conductive particles (e.g., nickel, carbon, or solder ball) are mixed with adhesive resin (e.g., thermosetting resin) to make a film, so that electric current flows only in one direction. When the ACF is disposed between the extension 232 and the flexible printed circuit board (not shown) located on the rear surface of the flexible display 230 and compressed by applying heat and pressure, a conductive pattern (not shown) formed on the extension 232 may be electrically connected to a conductive pattern formed on the flexible printed circuit board through conductive particles. In this case, the adhesive resin may bond the extension 232 and the flexible printed circuit board. Electrical paths included in the extension 232 may electrically connect at least one layer (e.g., a TFT film) and the flexible printed circuit board. For example, the electrical paths may be formed in the TFT film 612 based on LTPS (Low Temperature Polycrystalline Silicon), LTPO (Low Temperature Poly-Si & Oxide), or a-Si together with the TFT.

The chip-on-plastic method adopts mounting a display driving chip on a flexible polyimide (PI) substrate used as a display substrate. When the extension 232 is prepared by the chip-on-plastic method, the extension 232 may be formed to extend from the base film 620.

Figure 6:
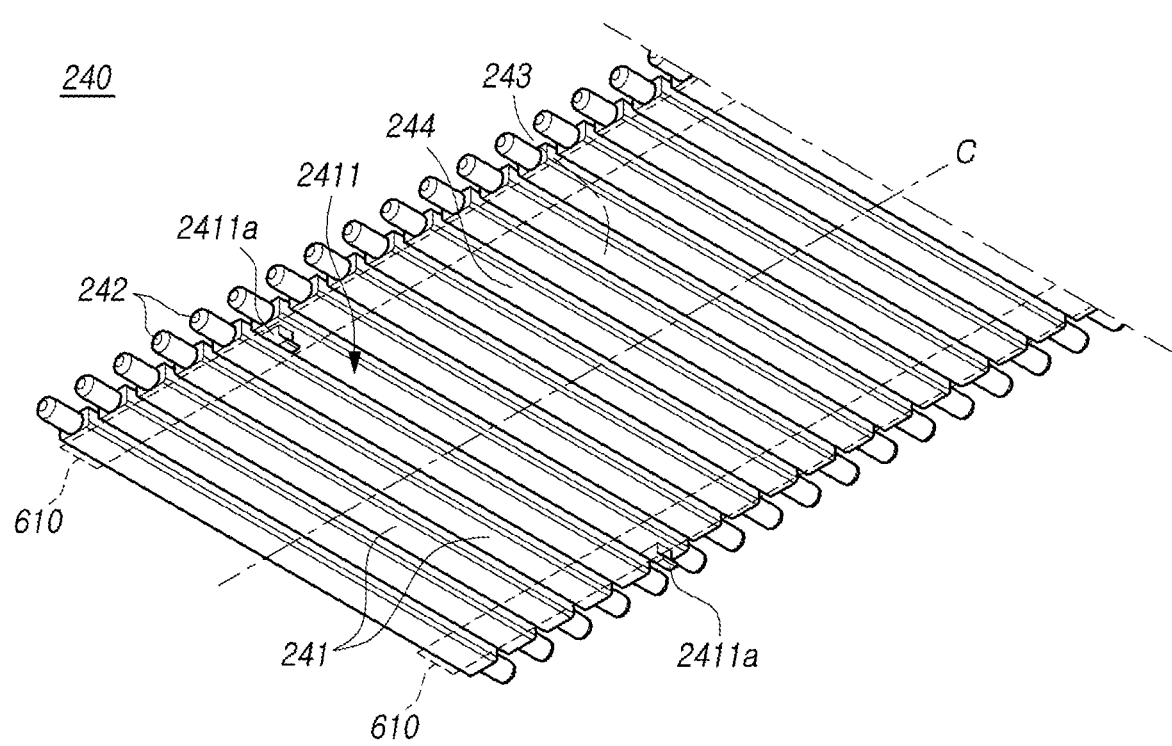
FIG. 6 is a view illustrating a bending member in an unfolded state according to an example embodiment.
Figure 7:
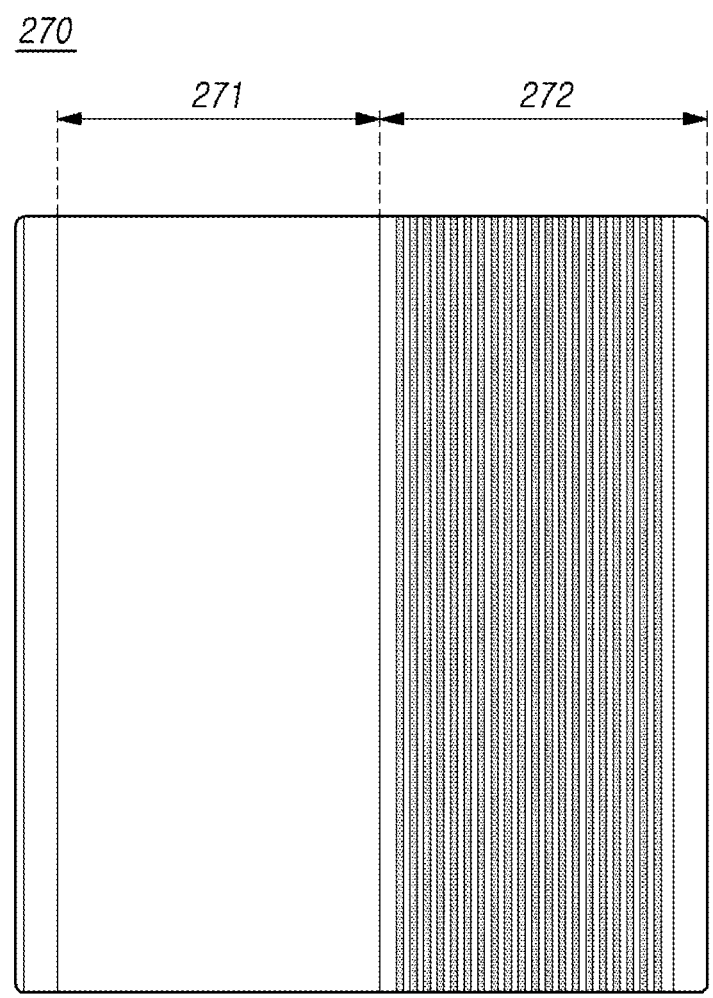
FIG. 7 is a view illustrating a support plate and a flexible section of a bending plate according to an example embodiment.

FIG. 6 is a view illustrating a bending member in an unfolded state according to an embodiment. FIG. 7 is a view illustrating a support plate and a flexible section of the bending plate according to an embodiment. And, FIG. 8 is a diagram illustrating the bending plate disposed between the flexible display and the bending member according to an embodiment.

Figure 8:
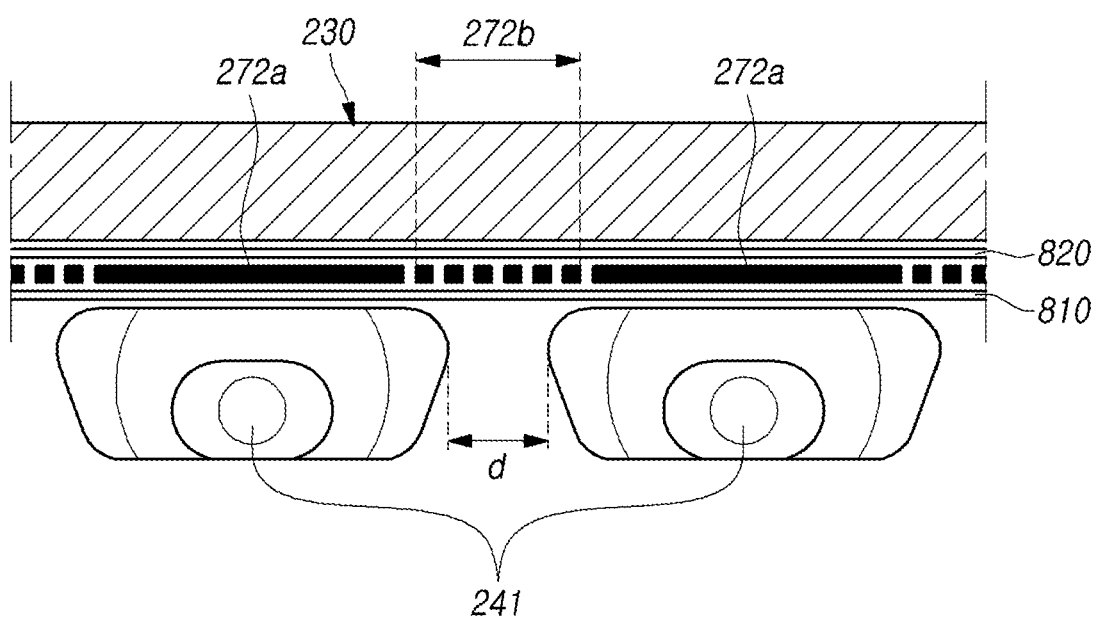
FIG. 8 is a view illustrating that a bending plate is disposed between a flexible display and a bending member according to an embodiment.

Referring not to FIGS. 6 to 8, the electronic device 200 may include a bending plate 270 between a plurality of bars 241 of the bending member 240 and a flexible display (e.g., the flexible display 230 of FIGS. 2A to 5B).

The bending member 240 of FIGS. 6 and 8 may be the same as or similar to the bending member 240 of FIGS. 4 to 5B.

According to an embodiment, the bending member 240 may include a plurality of bars 241. The plurality of bars 241 may be provided to perform, for example, an operation of pulling in/out of the flexible display 230. The plurality of bars 241 may be arranged in a direction parallel to each other, being spaced apart from each other by a predetermined interval.

According to an embodiment, the bending member 240 may include a front surface 243 that may be adhered to the flexible display 230 and a rear surface 244 opposite to the front surface 243 (e.g., see FIG. 6). The rear surface 244 of the bending member 240 may be adjacent to the second housing 220 (e.g., the sliding frame 225 of FIG. 4). Further, the front surface 243 of the bending member 240 may come into contact with the bending plate 270 supporting the flexible display 230.

According to an embodiment, guide protrusions 242 may be formed at both ends of the bar 241 of the bending member 240. In order to guide a movement path of the bending member 240, the guide protrusions 242 may be located in a guide rail (e.g., the guide rail 224 of FIG. 4 or 11).

According to an embodiment, a predetermined bar (e.g., the first bar 2411) among the plurality of bars 241 may further include a locking part (e.g., the first locking part 2411a). The locking part (e.g., the first locking part 2411a) may be, for example, a hook. The locking part (e.g., the first locking part 2411a) may be located on the rear surface 244 of the bending member 240. A multiplicity of the locking parts (e.g., the first locking part 2411a) may be arranged, for example, in portions adjacent to both ends of the plurality of bars 241 (e.g., in a first forming portion 610). The locking part (e.g., the first locking part 2411a) may be disposed in the first forming portion 610, so that the accommodating space inside the electronic device 200 (e.g., the first receiving part 2101 of FIG. 3A or the second receiving part 2201 FIG. 3A) can be efficiently used. Further, the locking part (e.g., the first locking part 2411a) may be disposed on the first forming portion 610, thereby enabling obtaining a space enough to mount electronic components on the rear surface of the sliding frame 225.

According to some embodiments, a plurality of locking parts (e.g., the first locking part 2411a) may be also arranged in the portions that are not adjacent from both ends of the plurality of bars 241. That is, a plurality of the locking parts (e.g., the first locking part 2411a) may be also disposed in the portions adjacent to a central axis C of the bending member 240. Here, the central axis C may refer to an axis extending in a direction perpendicular to the longitudinal direction of the plurality of bars 241 in the middle of the bending member 240.

According to one embodiment, a multiplicity of locking part (e.g., the first locking part 2411a) may be arranged to be symmetrical with respect to the central axis C of the predetermined bar (e.g., the first bar 2411). The locking part (e.g., the first locking part 2411a) may move along the direction perpendicular to the longitudinal direction of the bar 241 when the flexible display (e.g., the flexible display 230 of FIGS. 2A to 5B) is pulled-in or pulled-out.

According to an embodiment, the bending plate 270 may include a planar section 271 or a bending (curved) section 272. The bending section 272 is a section that may be bent by the movement of a sliding frame (e.g., the sliding frame 225 of FIG. 4) when the flexible display 230 is pulled-in or pulled-out. The bending plate 270 may be disposed, for example, between the bars 241 of the bending member 240 and the flexible display 230.

According to an embodiment, a second adhesive member 820 may be provided between the front surface of the bending plate 270 and the rear surface of the flexible display 230. The planar section 271 of the bending plate 270 may be adhered to, for example, a portion corresponding to a planar portion (e.g., the first region 230a of FIG. 3A) of the flexible display 230. Further, the bending section 272 of the bending plate 270 may be adhered to, for example, a portion corresponding to the bent portion (e.g., the second region 230b of FIG. 3A) of the flexible display 230.

According to an embodiment, a first adhesive member 810 may be provided between the rear surface of the bending plate 270 and the bending member 240. The bending member 240 may be adhered to, for example, the bending section 272 on the rear surface of the bending plate 270. The first adhesive member 810 may be provided only in the bending section 272 of the bending plate 270.

The bending plate 270 may be formed of a metal material or a rubber material (e.g., urethane, Liquid Silicone Rubbers (LSR)), but the present invention is not limited thereto. The bending plate 270 may be formed of a material that flexibly varies with compressive force and tensile stress and has no change in thickness when applied to the compressive force and/or the tensile stress.

According to an embodiment, the bending section 272 of the bending plate 270 may include a support plate 272a and a flexible (or stretchable) section 272b. A plurality of bars 241 may be attached to the support plate 272a, for example. The flexible section 272b may include, for example, a plurality of holes or a plurality of recesses arranged in a certain interval in at least a part of its length. As the holes or a recesses are formed in the flexible section 272b, the flexible section 272b may be flexibly bent. A plurality of holes may be arranged in a lattice pattern in the flexible section 272b. When the bending portion (e.g., the second region 230b of FIG. 3A) of the flexible display 230 moves via a curved surface (e.g., the curved surface 2251 of FIG. 4) of a sliding frame (e.g., the sliding frame 225 of FIG. 4).), the interval (d) of the bars 241 passing through the curved surface 2251 becomes narrower, which may then cause a local tensile stress to occur in a section between the bars 241. This flexible section 272b can flexibly bend the bending member 240 to reduce interference between the bars 241 due to the tensile stress, thereby making it possible to reduce occurrence of birdcaging of the bending plate 270.

Figure 9A:
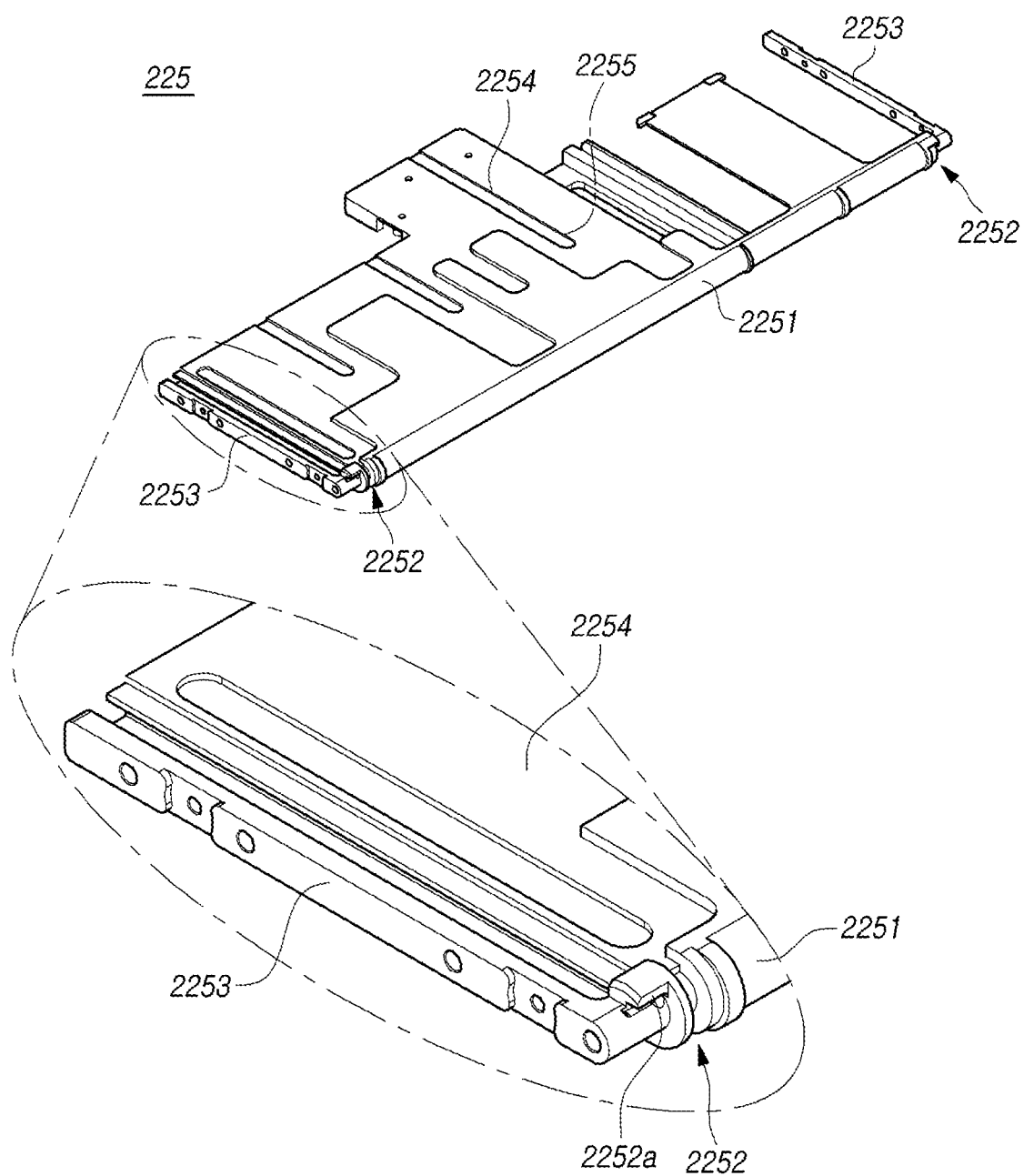
FIG. 9A is an upper perspective view of a sliding frame with its stop guide enlarged according to an example embodiment.
Figure 9B:
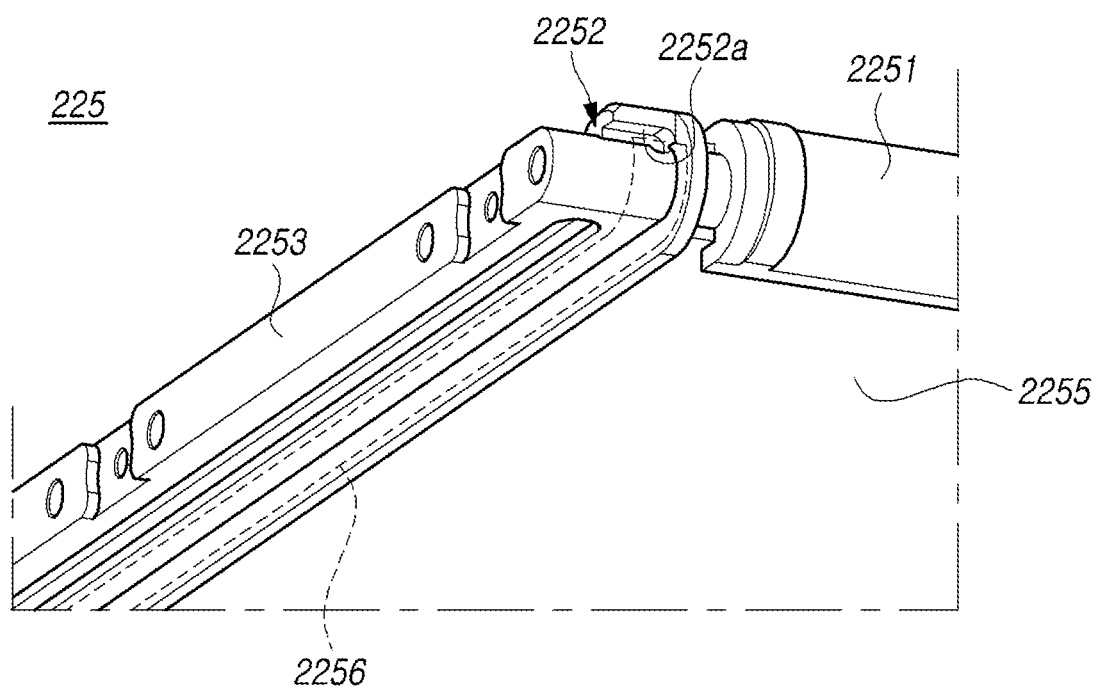
FIG. 9B is a lower perspective view of a sliding frame with its stop guide enlarged according to an example embodiment.
Figure 10:
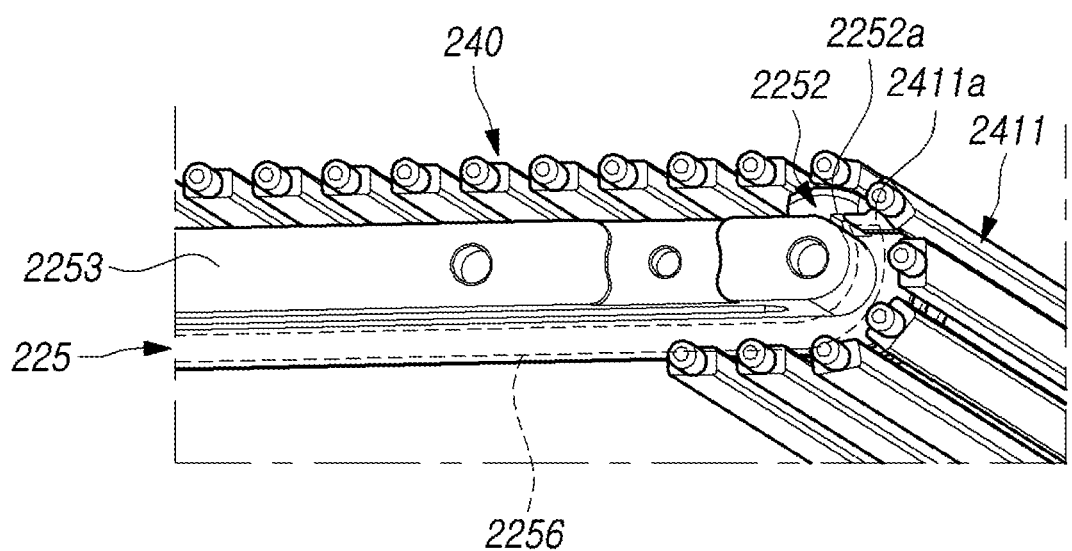
FIG. 10 is a view illustrating an arrangement in which a bending member is disposed on a sliding frame according to an example embodiment.
Figure 11:
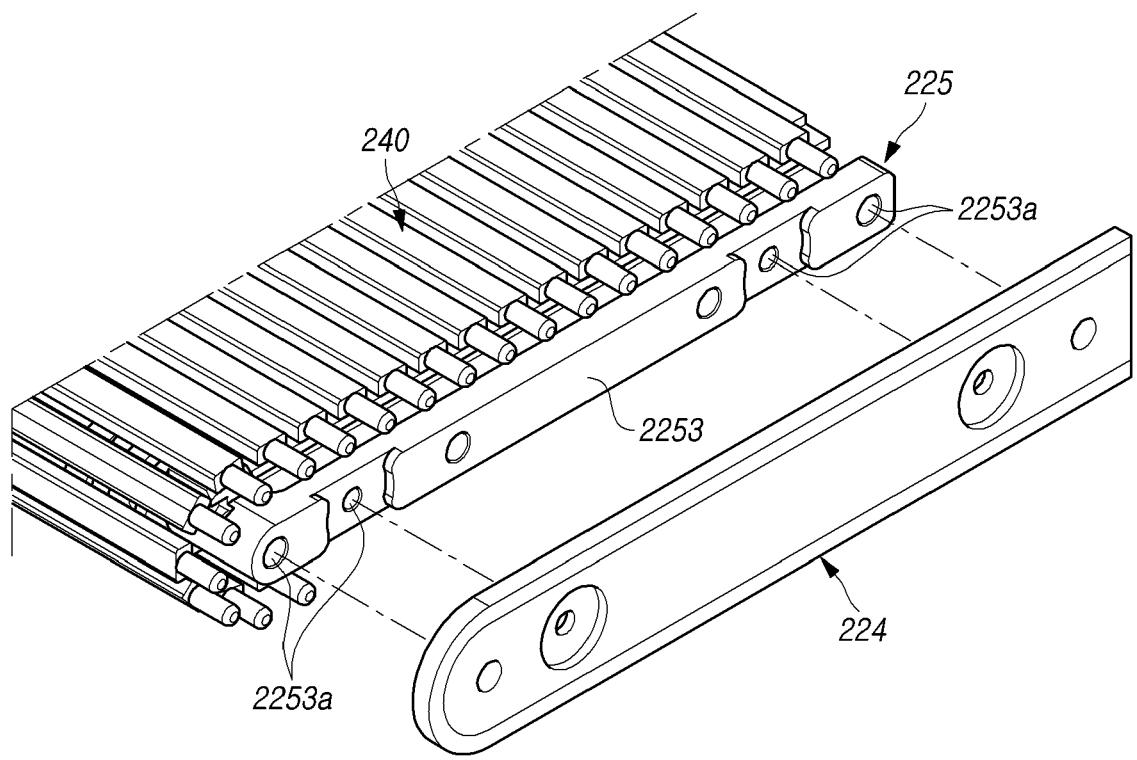
FIG. 11 is a view illustrating a process of assembling a guide rail to a sliding frame in which a bending member is disposed, according to an example embodiment.

FIG. 9A is an upper perspective view of a sliding frame with its stop guide enlarged, according to an embodiment of the disclosure. FIG. 9B is a lower perspective view of the sliding frame with its stop guide enlarged, according to an embodiment of the disclosure. FIG. 10 is a view illustrating a state in which the bending member is disposed on the sliding frame according to an embodiment of the disclosure. And, FIG. 11 is a view illustrating a process of assembling a guide rail to the sliding frame on which the bending member is disposed, according to an embodiment of the disclosure.

Referring now to FIGS. 9A to 11, the electronic device 200 may include a first housing 210, a second housing 220, a flexible display 230, a guide rail 224, or a bending member 240. The configuration of the second housing 220 (e.g., the sliding frame 225), the bending member 240, or the guide rail 224 as illustrated herein, may be, in part or all, substantially the same as that of the housing 220 (e.g., the sliding frame 225), the bending member 240, or the guide rail 224 of FIG. 4.

According to an embodiment, the sliding frame 225 may include a front surface 2254, a rear surface 2255, a curved surface 2251, or sides 2253. The front surface 2254 of the sliding frame 225 may be a surface adjacent to the flexible display 230. The rear surface 2255 of the sliding frame 225 may be a surface facing opposite to the front surface 2254. The front surface 2254 and the rear surface 2255 of the sliding frame 225 may be connected to each other by both sides 2253 and the curved surface 2251. Both the sides 2253 of the sliding frame 225 may be formed, for example, to extend in the vertical direction substantially parallel to the longitudinal direction of the curved surface 2251 of the sliding frame 225 from both the ends of the curved surface 2251 of the sliding frame 225. Onto one or both of the sides 2253 of the sliding frame 225 may be assembled a guide rail 224, for example. The guide rail 224 may be, for example, coupled to the side 2253 of the sliding frame 225 by a screw coupling. For example, a plurality of screw holes 2253a may be formed in the side 2253 of the sliding frame 225. The curved surface 2251 of the sliding frame 225 may be, for example, a surface through which the bending member 240 passes when the flexible display (e.g., the flexible display 230 of FIG. 4) is pulled-in or pulled-out.

According to an embodiment, the sliding frame 225 may further include a stop guide 2252. The stop guide 2252 may be provided at both ends of the curved surface 2251 of the sliding frame 225, for example. In other words, the stop guide 2252 may be disposed in between the curved surface 2251 of the sliding frame 225 and the side 2253 of the sliding frame 225.

According to an embodiment, the stop guide 2252 may include a locking jaw (e.g., the first locking jaw 2252a). The locking jaw (e.g., the first locking jaw 2252a) of the stop guide 2252 may cause the locking part (e.g., the first locking part 2411a) of the bending member 240 to be caught. For example, when the flexible display (e.g., the flexible display 230 of FIG. 4) is drawn out to reach its open state, the locking jaw (e.g., the first locking jaw 2252a) may cause the locking part (e.g., the first locking part 2411a) to be caught on the locking jaw (e.g., the first locking jaw 2252a), so as to stop the movement of the bending member 240. The locking jaw (e.g., the first locking jaw 2252a) may have a shape corresponding to the shape of the locking part (e.g., the first locking part 2411a).

According to an embodiment, the sliding frame 225 may include an empty space of passage (e.g., a first passage 2256). The passage (e.g., the first passages 2256) may be formed according to the number of locking jaws (e.g., the first locking jaws 2252a). For example, when the locking jaw (e.g., the first locking jaw 2252a) is respectively provided at both ends of the curved surface 2251, two of the passages (for example, the first passage 2256) may be arranged at the position corresponding to the locking jaw (e.g., the first locking jaw 2252a). The passage (e.g., the first passage 2256) may be formed, for example, in a direction parallel to the side 2253 of the sliding frame 225. The passage (e.g., the first passage 2256) may be formed, for example, as an empty space between the locking jaw (e.g., the first locking jaw 2252a) and a position where the locking part (e.g., the first locking part 2411a) is located, in the closed state of the flexible display (e.g., the flexible display 230 of FIG. 4). At least a portion of the passage (e.g., the first passage 2256) may be formed in, for example, the stop guide 2252 of the sliding frame 225. The passage (e.g., the first passage 2256) may, for example, extend in a planar direction along the rear surface 2255 of the sliding frame 225, and may extend bending in the curved surface 2251 or the stop guide 2252 of the sliding frame 225. The passage (e.g., the first passage 2256) may be formed, for example, being recessed inwardly in a portion adjacent to both ends of the rear surface 2255 of the sliding frame 225. The passage (e.g., the first passage 2256) may be located, for example, in a region that at least partially overlaps a portion adjacent to both ends of the plurality of bars 241 (e.g., the first forming portion 610 of FIG. 6). Accordingly, the locking part (e.g., the first locking part 2411a) of the bending member 240 may move within the passage (e.g., the first passage 2256) without contact with any other parts within the electronic device 200 until it is caught on the locking jaw (e.g., the first locking jaw 2252a) in the pull-in and/or pull-out operation.

Figure 12A:
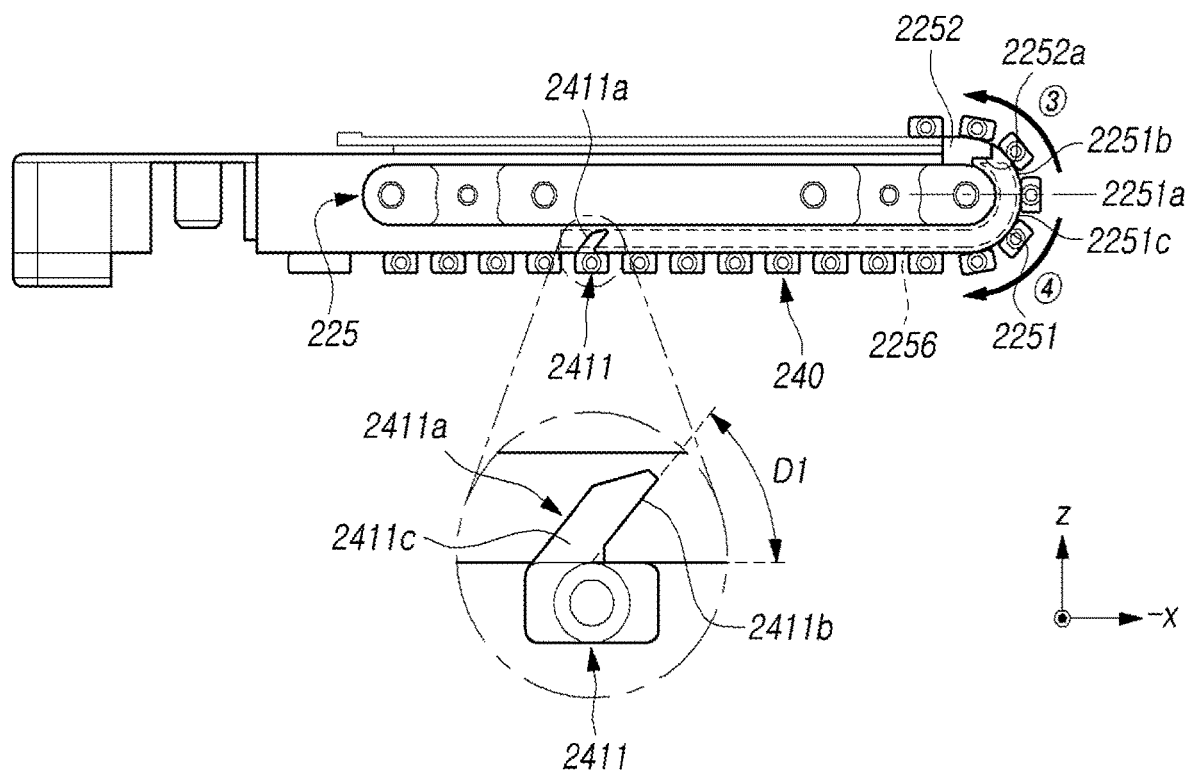
FIG. 12A is a cross-sectional view of an electronic device taken along a line 12a-12a of FIG. 2A according to an example embodiment.
Figure 12B:
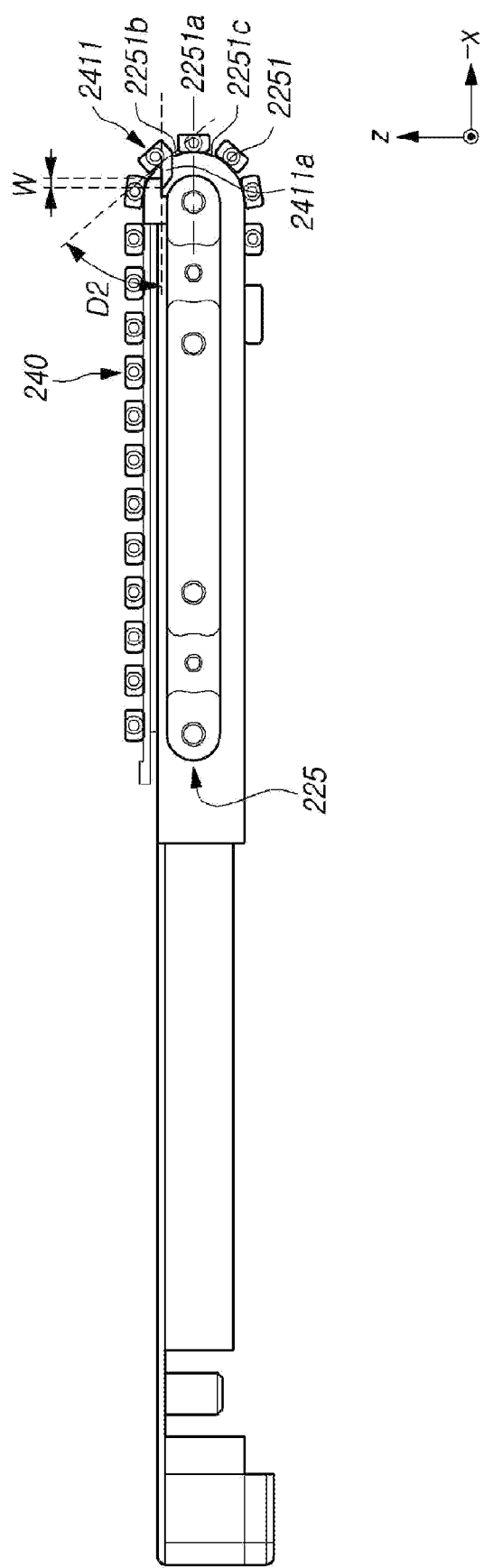
FIG. 12B is a cross-sectional view of an electronic device taken along a line 12B-12B of FIG. 3A according to an example embodiment.
Figure 12C:
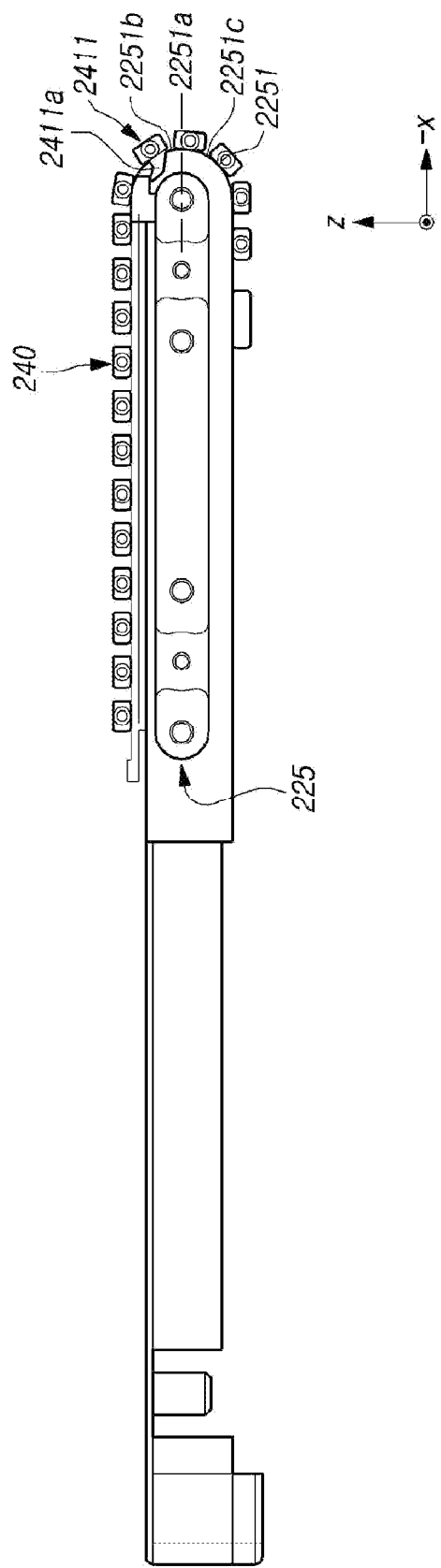
FIG. 12C is a cross-sectional view of an electronic device illustrating an initial state when the pull-in operation is initiated in FIG. 12B, according to an example embodiment.
Figure 13A:
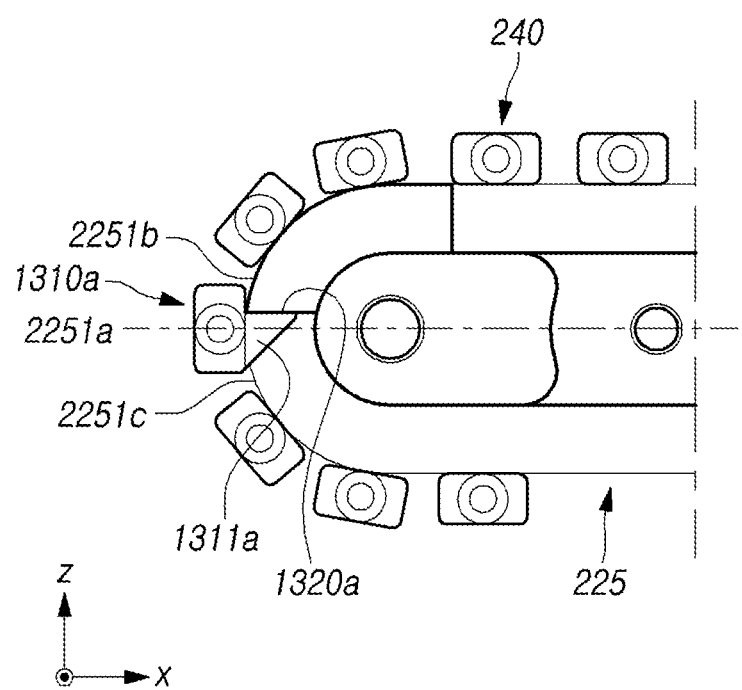
FIGS. 13A to 13D are cross-sectional views for explaining a locking part and a locking jaw having different shapes depending on a change in position of a predetermined bar including the locking part, in an open state, according to various example embodiments.
Figure 13B:
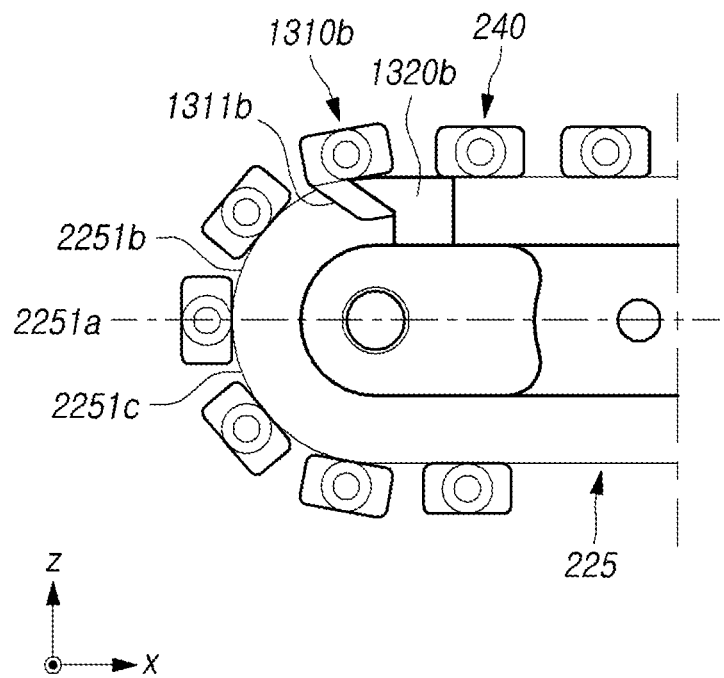
Figure 13C:
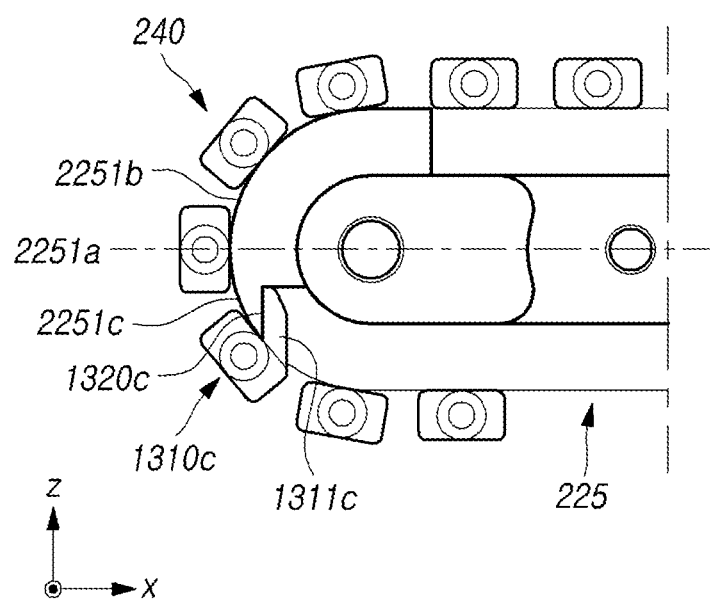
Figure 13D:
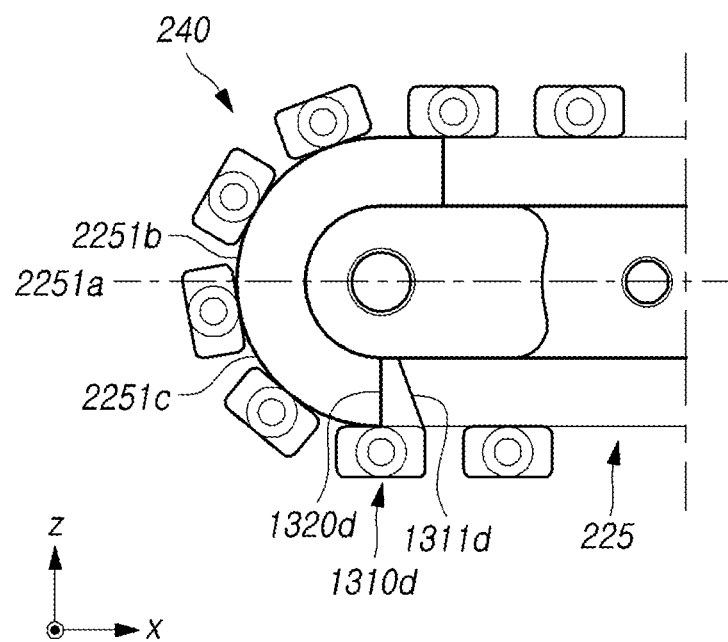

FIG. 12A is a cross-sectional view of the electronic device taken along a line 12a-12a of FIG. 2A according to an embodiment of the disclosure. FIG. 12B is a cross-sectional view of the electronic device taken along a line 12b-12b of FIG. 3A according to an embodiment of the disclosure. And, FIG. 12C is a cross-sectional view of the electronic device illustrating an initial state when a pull-in operation is started in FIG. 12B according to an embodiment of the disclosure.

Referring now to 12A to 12C, the electronic device 200 may include a first housing 210, a second housing 220, a flexible display 230, a guide rail 224, or a bending member 240. The configuration of the first housing 210, the second housing 220 or the bending member 240 as illustrated herein may be in part or all the same as that of the first housing 210, the second housing 220 or the bending member 240 of FIGS. 4 to 5B, and FIGS. 9A to 10. In particular, the configuration of the passage of the sliding frame 225 (e.g., the first passage 2256) illustrated herein may be in part or all the same as that of the passage (e.g., the first passage 2256) of the sliding frame 225 of FIG. 9B. In the following description, the upper part 2251b of the curved surface 2251 is a portion on the front surface 2254 of the sliding frame 225 with respect to a central part 2251a of the curved surface 2251, and the lower part 2251c of the curved surface 2251 is a portion on the rear surface 2255 side of the sliding frame 225 with respect to the central part 2251a of the curved surface 2251.

The locking part (e.g., the first locking part 2411a) of the bending member 240 may be located on the rear surface 2255 of the sliding frame 225 in the closed state. In the closed state, the locking part (e.g., the first locking part 2411a) of the bending member 240, may be located, for example, in a first position of the passage of the sliding frame 225 (e.g., the first passage 2256). Here, the first position of the passage (e.g., the first passage 2256) may be a position of the passage (e.g., the first passage 2256) that is farthest spaced from the locking jaw (e.g., the first locking jaw 2252a).

According to an embodiment, the predetermined bar (e.g., the first bar 2411) with the locking part (e.g., the first stopping/locking part 2411a) may be, in the open state, a bar 241 positioned adjacent to the curved surface 2251. In the open state, the locking part (e.g., the first locking part 2411a) may be located, for example, at a second position of the passage (e.g., the first passage 2256) of the sliding frame 225. Here, the second position of the passage (e.g., the first passage 2256) may be opposite to the first position of the passage (e.g., the first passage 2256), and may be located adjacent to the locking jaw (e.g., the first locking jaw 2252a). As another example, the locking part (e.g., the first locking part 2411a) may be located, in the open state, in a portion where the passage (e.g., the first passage 2256) of the sliding frame 225 and the locking jaw (e.g., the first locking jaw 2252a) come into contact with each other. According to some embodiments, the predetermined bar (e.g., the first bar 2411) with the locking part (e.g., the first locking part 2411a) may be, in the open state, the bar 241 positioned adjacent to the rear surface 2255 of the sliding frame 225.

According to an embodiment, the locking part (e.g., the first locking part 2411a) of the bending member 240 may include a locking surface 2411b or a support 2411c. The locking surface 2411b may be in contact with the locking jaw (e.g., the first locking jaw 2252a), so that the locking part (e.g., the first locking part 2411a) can be caught on the locking jaw (e.g., the first locking jaw 2252a). The support 2411c may be, in one end, in contact with the locking surface 2411b, and may be, in other end, in contact with the determined bar (e.g., the first bar) including the locking part (e.g., the first locking part 2411a). The support 2411c may support the locking surface 2411b, and may connect the locking surface 2411b and the predetermined bar (e.g., the first bar 2411).

According to an embodiment, a first angle D1 formed by the locking surface 2411b of the locking part (e.g., the first locking part 2411a) and a plane of the predetermined bar (e.g., the first bar 2411) may vary depending on a position of the determined bar (e.g., the first bar 2411) in the open state. For example, the first angle D1 may be, in the open state, substantially the same as a second angle D2 formed by the plane of the predetermined bar (e.g., the first bar 2411) and the locking jaw (e.g., the first locking jaw 2252a). The predetermined bar (e.g., the first bar 2411) may be located on the curved surface 2251 of the sliding frame 225, in the open state. That is, the predetermined bar (e.g., the first bar 2411) may be located at a predetermined position on the curved surface 2251, in the open state. In the open state, the second angle D2 formed by the predetermined bar (e.g., the first bar 2411) and the locking jaw (e.g., the first locking jaw 2252a) may vary depending on where the predetermined bar (e.g., the first bar 2411) is located. Accordingly, the shape of the locking part (e.g., the first locking part 2411a) can be designed so that the first angle D1 is substantially the same as the second angle D2, in order for the locking surface 2411b to be effectively in close contact with the locking jaw (e.g., the first locking jaw 2252a) and caught on the locking jaw.

The sliding frame 225 may cause the bending member 240 (or the flexible display 230) to be pulled out by performing the pull-out operation until it reaches the open state from the closed state. When the open state is reached by the pull-out operation, the sliding frame 225 does not move any more in the pulled-out direction (e.g., the direction ① in FIG. 3A) and is caused to stop. In the pull-out operation, the bending member 240 may move in the direction of the front surface 2254 (e.g., in the direction ③ or pulled-out direction) of the sliding frame 225 with respect to the central part 2251a of the curved surface 2251, owing to movement of the guide rail 224 assembled onto the side 2253 of the sliding frame 225 in the pulled-out direction (e.g., the direction ① of FIG. 3A). When the bending member 240 reaches the open state by the pulling-out operation, it can still move in the direction ③ (or the pulled-out direction) due to inertia, even after the sliding frame 225 stops. In such a case, as the distance between the bars 241 arranged on the upper part of the sliding frame 225 of the bending member 240 is narrowed, a phenomenon in which the bending member 240 is distorted (hereinafter, referred to as a "distortion phenomenon"). As a result, it may occur a phenomenon in which the flexible display 230 gets lifted from the sliding frame 225 or the housing (e.g., the first housing 210) (hereinafter, referred to as a "birdcaging or lifting phenomenon"). According to various embodiments, the locking part (e.g., the first locking part 2411a) may be formed in a predetermined bar (e.g., the first bar 2411), and the locking jaw (e.g., the first locking jaw 2252a) may be formed in both ends of the curved surface 2251 of the sliding frame 225, so that when the open state is reached in the pull-out operation, the bending member 240 may stop at a predetermined position. Therefore, it is possible to prevent or reduce the likelihood of the distortion phenomenon of the bending member 240 or the birdcaging of the flexible display 230.

According to one embodiment, in the open state, a size of the locking part (e.g., the first locking part 2411a) may be adjusted so that a maximum or a large locking length (W) that the locking part (e.g., the first locking part 2411a) and the locking jaw (e.g., the first locking jaw 2252a) come into contact with each other is greater than a maximum separation distance between the sliding frame 225 and the predetermined bar (e.g., the first bar 2411) with the locking part (e.g., the first locking part 2411a). Here, the maximum separation distance may be referred to as a distance that, in the open state, the predetermined bar (e.g., the first bar 2411) can be maximally or largely spaced apart from the curved surface 2251 within the guide rail (e.g., the guide rail 224 of FIG. 4). The maximum separation distance may be, for example, calculated in consideration of a first tolerance of the guide rail (e.g., the guide rail 224 of FIG. 4), a second tolerance of the guide protrusion 242 of the bending member 240, or a first distance in which the guide protrusion 242 of the bending member 240 can move within the guide rail (e.g., the guide rail 224 of FIG. 4). The locking part (e.g., the first locking part 2411a) may be formed, for example, such that the maximum or enlarged separation distance is greater than the sum of the first tolerance, the second tolerance and the first distance, and thus, in the open state, the locking part (e.g., the first locking part 2411a) may be always caught on the locking jaw (e.g., the first locking jaw 2252a).

The electronic device 200 may operate to cause the sliding frame 225 to move in the pulled-in direction (e.g., the direction ② in FIG. 2A) during the pull-in operation from the open state, thereby having the bending member 240 (or the flexible display 230) pulled-in. During the initial pull-in operation from the open state, the guide rail (e.g., the guide rail 224 of FIG. 4) may move along the sliding frame 225 in the pulled-in direction (e.g., the direction ② of FIG. 2A) to pressure the bending member 240. This pressure may cause the bars 241 arranged on the upper part 2251b of the curved surface 2251 of the bending member 240 to be applied force in the direction of the front surface 2254 of the sliding frame 225 (e.g., in the direction ③ or the pulled-out direction), and cause the bars 241 arranged in the lower part 2251c of the curved surface 2251 of the bending member 240 to be applied force in the direction of the rear surface 2255 of the sliding frame 225 (e.g., in the direction ④ or the pulled-in direction). At this moment, the force applied in the direction ③ (or the pulled-out direction) may be offset by the locking part (e.g., the first locking part 2411a) caught on the locking jaw (e.g., the first locking jaw 2252a), thereby preventing or reducing a chance of a portion of the bending member 240 from moving in the direction ③ (or the pulled-out direction) and then allowing it to move only in the direction ④ (or the pulled-in direction), as illustrated in FIG. 12C. Accordingly, it is possible to prevent or reduce a chance of occurrence of distortion of the bending member 240 or birdcaging of the flexible display 230 that may occur when a portion of the bending member 240 moves in the direction ③ (or the pulled-out direction), during performing the pull-in operation from the open state, in the flexible display 230.

FIGS. 13A to 13D are cross-sectional views for explaining a locking part and a locking jaw having different shapes depending on a change in position of a predetermined bar including the locking part, in the open state, according to various embodiments.

A bending member 240 and/or a sliding frame 225 shown in FIGS. 13A to 13D may be coupled to a first housing 210, a second housing 220, a flexible display 230 and or a guide rail 224. The configuration of the illustrated sliding frame 225 and/or bending member 240 may be substantially the same in part or all as the configuration of the sliding frame 225 or the bending member 240 of FIGS. 4 to 5B and FIGS. 10 to 12 for example. In the following description, the upper part 2251b of the curved surface 2251 may be a portion on the front surface 2254 of the sliding frame 225 with respect to the central part 2251a of the curved surface 2251, and the lower part 2251c of the curved surface 2251 may be a portion on the rear surface 2255 of the sliding frame 225 with respect to the central part 2251a of the curved surface 2251.

According to another embodiment, the bending member 240 may include a predetermined bar (e.g., the second bar 1310a in FIG. 13A) positioned on the upper part 2251b of the curved surface 2251, in an open state. A locking jaw (e.g., the second locking jaw 1320a) may be disposed on the upper part 2251b of the curved surface 2251, in response to the predetermined bar (e.g., the second bar 1310a). The locking jaw (e.g., the second locking jaw 1320a) may be formed, for example, in the direction (e.g., x-axis direction) substantially parallel to the plane (e.g., the front surface 2254 or the rear surface 2255) of the sliding frame 225. The locking part (e.g., the second locking part 1311a) may be caused to be caught on the locking jaw (e.g., the second locking jaw 1320a), during the pull-in operation from the open state, thereby preventing or reducing a chance of the bending member 240 from moving in the direction ③ (or the pulled-out direction), and thus, effectively preventing or reducing a chance of the predetermined bar (e.g., the second bar 1310a) on the upper part 2251b of the curved surface 2251 from being lifted in the direction (e.g., the z-axis direction) substantially perpendicular to the plane of the sliding frame 225.

According to another embodiment, the bending member 240 may include a predetermined bar (e.g., a third bar 1310b in FIG. 13B) positioned adjacent to the front surface 2254 of the sliding frame 225 of the upper parts 2251b of the curved surface 2251, in the open state. In response to the predetermined bar (e.g., the third bar 1310b), a locking jaw (e.g., the third locking jaw 1320b) may be disposed on the upper part 2251b of the curved surface 2251. The locking jaw (e.g., the third locking jaw 1320b) may be formed, for example, in an oblique direction. For example, the locking jaw (e.g., the third locking jaw 1320b) may be formed to make an angle of approximately 45 degrees with the plane (e.g., the front surface 2254 or the rear surface 2255) of the sliding frame 225. The locking part (e.g., the third locking part 1311b) may be caused to be caught on the locking jaw (e.g., the third locking jaw 1320b) during the pull-in operation from the open state, thereby preventing or reduce a chance of the bending member 240 from moving in the direction ③ (or the pulled-out direction), and thus, preventing, or reduce a chance of, to some extent the predetermined bar (e.g., the third bar 1310b) on the upper part 2251b of the curved surface 2251 from being lifted in the direction (e.g., the z-axis direction) substantially perpendicular to the front surface 2254 of the sliding frame 225.

According to another embodiment, the bending member 240 may include a predetermined bar (e.g., a fourth bar 1310c in FIG. 13C) positioned on the lower part 2251c of the curved surface 2251, in an open state. In response to the predetermined bar (e.g., the fourth bar 1310c), a locking jaw (e.g., the fourth locking jaw 1320c) may be disposed on the lower part 2251c of the curved surface 2251. The locking jaw (e.g., the fourth locking jaw 1320c) may be formed, for example, in the direction (e.g., the z-axis direction) substantially perpendicular to the plane (e.g., the front surface 2254 or the rear surface 2255) of the sliding frame 225. The locking part (e.g., the fourth locking part 1311c) may be caused to be caught on the locking jaw (e.g., the fourth locking jaw 1320c) during the pull-in operation from the open state, thereby guiding the bending member 240 to move in the direction ④ (or in the pulled-in direction).

According to another embodiment, the bending member 240 may include a predetermined bar (e.g., a fifth bar 1310d in FIG. 13D) located adjacent to the rear surface 2255 of the sliding frame 225 of the lower parts 2251c of the curved surface 2251, or located on the rear surface 2255 of the sliding frame, in the open state. In response to the predetermined bar (e.g., the fifth bar 1310d in FIG. 13D), a locking jaw (e.g., a fifth locking jaw 1320d) may be disposed on the lower part 2251c of the curved surface 2251 or on the rear surface 2255 of the sliding frame 225. The locking jaw (e.g., the fifth locking jaw 1320d) may be, for example, in the direction (e.g., z axial direction) substantially perpendicular to the plane of the sliding frame 225 (e.g., the front surface 2254 or the rear surface 2255). The locking part (e.g., the fifth locking part 1311d) may be caused to be caught on the locking jaw (e.g., the fifth locking jaw 1320d) during the pull-in operation from the open state, thereby guiding the bending member 240 to move in the direction ④ direction (or in the pulled-in direction).

According to various embodiments, the bending member 240 may be formed of a combination of two or more of the first bar to the fifth bar. Accordingly, the sliding frame 225 may include a structure corresponding to the above-described combination among the first locking jaw to the fifth locking jaw. According to an embodiment, the bending member 240 may include a locking part on the bar at two places, as shown in FIGS. 14 to 16B. Hereinafter, the structure will be described in more detail.

Figure 14:
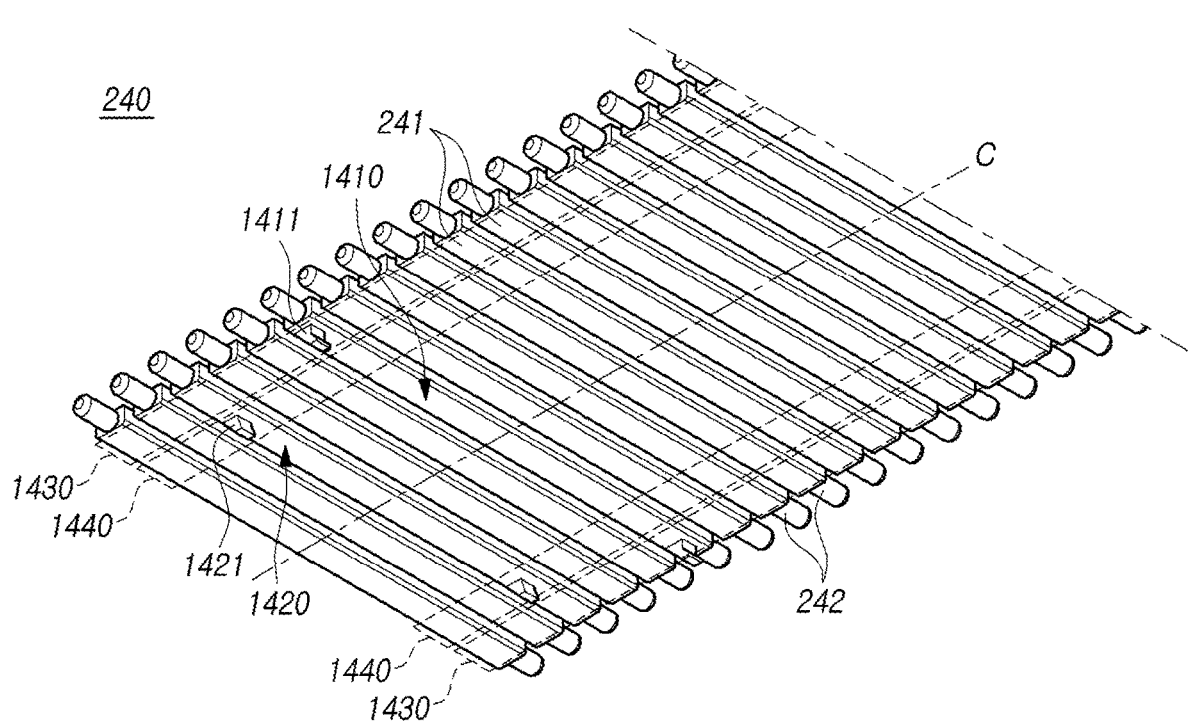
FIG. 14 is a view illustrating an unfolded state of a bending member according to another example embodiment.
Figure 15A:
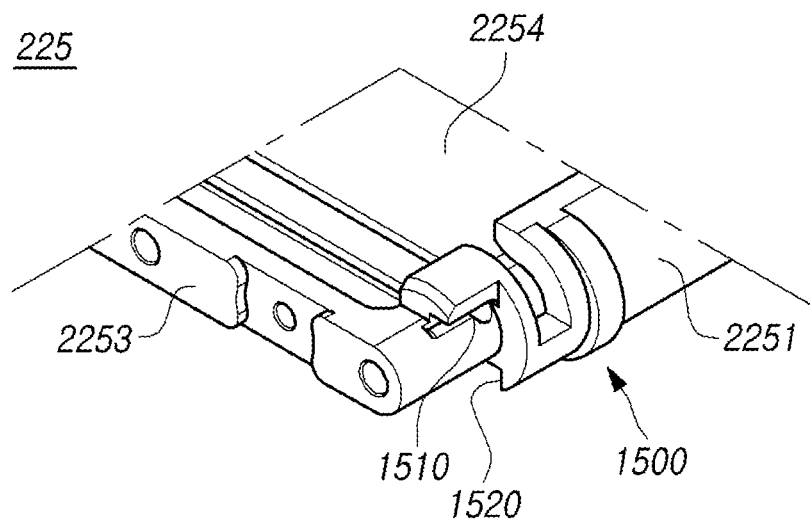
FIG. 15A is an upper perspective view of a sliding frame with its stop guide enlarged, according to another example embodiment.
Figure 15B:
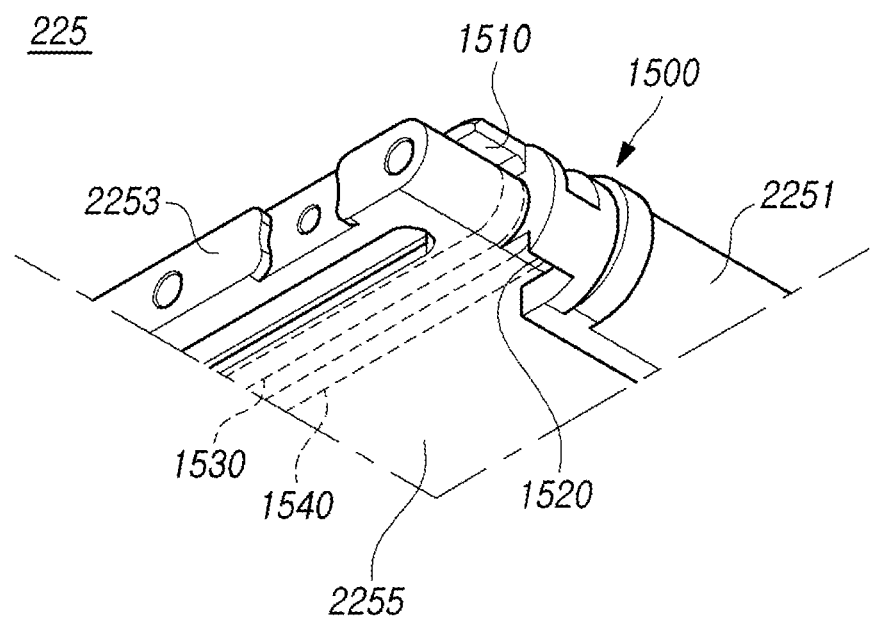
FIG. 15B is a lower perspective view of a sliding frame with its stop guide enlarged, according to another example embodiment.
Figure 16A:
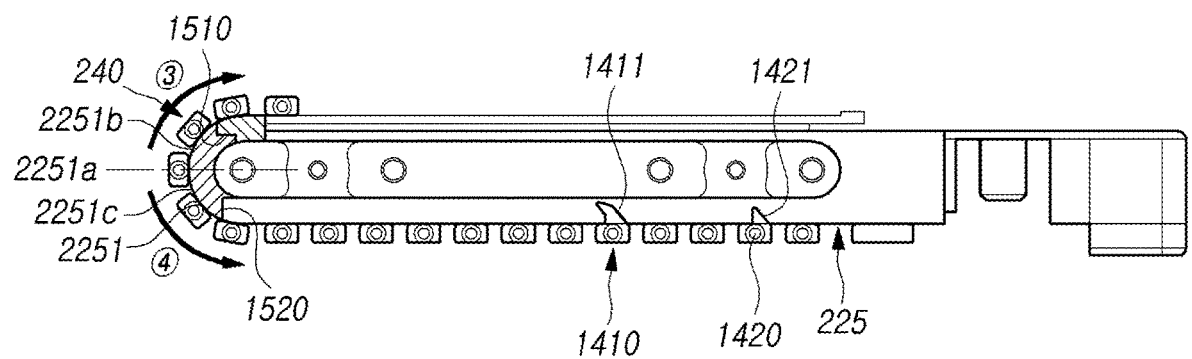
FIG. 16A is a cross-sectional view of an electronic device in a closed state according to another example embodiment.
Figure 16B:
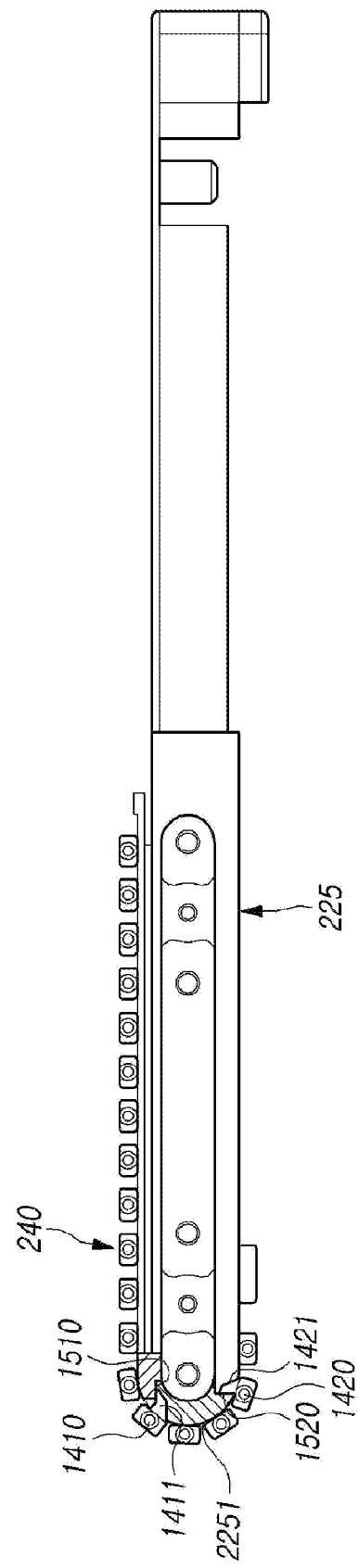
FIG. 16B is a cross-sectional view of an electronic device in an open state according to another example embodiment.

FIG. 14 is a view illustrating an unfolded state of the bending member according to another embodiment. FIG. 15A is an upper perspective view of the sliding frame with its stop guide enlarged, according to another embodiment. FIG. 15B is a lower perspective view of the sliding frame with its stop guide enlarged, according to another embodiment. FIG. 16A is a cross-sectional view of an electronic device in a closed state, according to another embodiment. And, FIG. 16B is a cross-sectional view of an electronic device in an open state, according to another embodiment.

Referring now to FIGS. 14 to 16B, the electronic device 200 may include a first housing 210, a second housing 220, a flexible display 230, a guide rail 224, or a bending member 240. The illustrated configuration of the first housing 210, the second housing 220 or the bending member 240 may be substantially the same in part or all as the configuration of the first housing 210, the second housing 220 or the bending member 240 as shown in FIGS. 4 to 6 and FIGS. 9A to 12.

According to an embodiment, the bending member 240 may include a plurality of bars 241. The plurality of bars 241 may be arranged, for example, in the direction parallel to each other, and spaced apart from each other by a predetermined interval.

According to an embodiment, the bending member 240 may include the plurality of bars 241, of which two or more predetermined bars (e.g., the sixth bar 1410 or the seventh bar 1420) may include locking part s (e.g., the sixth locking part 1411 or the seventh locking part 1421). The sixth bar 1410 may include, for example, two sixth locking parts 1411 each positioned to the left and right symmetrically with respect to the central part C of the bending member 240. Multiple sixth locking parts 1411 may be disposed, for example, in portions adjacent to both ends of the bar 241 (e.g., in a second forming portion 1430). The seventh bar 1420 may include, for example, two seventh locking parts 1421 each arranged to the left or right symmetrically with respect to the central part C of the bending member 240. Multiple seventh locking parts 1421 may be disposed, for example, in portions adjacent to both ends of the bar 241 and not overlapping the second forming portion 1430 (e.g., in a third forming portion 1440). Since the second forming portion 1430 and the third forming portion 1440 do not overlap each other, the sixth and seventh locking parts 1411 and 1421 may be disposed in parallel to each other. For example, the second forming portion 1430 may be located further out of the bars 241 than the third forming portion 1440. Accordingly, the sixth locking part 1411 and the seventh locking part 1421 may have different moving paths that do not overlap each other during the pull-in and/or pull-out operation.

According to an embodiment, the sliding frame 225 may include a stop guide 1500. The stop guide 1500 may be provided, for example, at both ends of the curved surface 2251 of the sliding frame 225, respectively. The stop guide 1500 may include, for example, a plurality of locking jaws (e.g., the sixth locking jaw 1510 or the seventh locking jaw 1520). The sixth locking jaw 1510 may cause, for example, the sixth stopping/locking part 1411 to be caught. The seventh locking jaw 1520 may cause, for example, the seventh locking part 1421 to be caught. When the flexible display (e.g., the flexible display 230 of FIG. 4) is drawn out to reach the open state, the sixth and seventh locking parts 1411 and 1421 may be respectively caught on the sixth locking jaw 1510 and the seventh locking jaw 1520, thereby causing the movement of the bending member 240 to stop. The sixth locking jaw 1510 may be disposed, for example, on the upper part 2251b of the curved surface 2251. Further, the seventh locking jaw 1520 may be disposed, for example, on the lower part 2251c of the curved surface 2251. According to some embodiments, both the sixth and seventh locking jaws 1510 and 1520 may be disposed either on the upper part 2251b of the curved surface 2251, or on the lower part 2251c of the curved surface 2251.

According to an embodiment, the sliding frame 225 may include an empty space of passage (e.g., a second passage 1530 or a third passage 1540).

The second passage 1530 may be formed, for example, according to the number of the sixth locking jaws 1510. The second passage 1530 may include, for example, two second passages each arranged at a position corresponding to the sixth locking jaw 1510, in case where each sixth locking jaw 1510 is provided at both ends of the curved surface 2251. The second passage 1530 may be formed, for example, as an empty space between the sixth locking part 1510 and a position where the sixth locking part 1411 is located in the closed state. The second passage 1530 may be located, for example, in a region at least partially overlapping the portions adjacent to both ends of the bar 241 (e.g., the second forming portion 1430 of FIG. 14).

The third passage 1540 may be formed, for example, according to the number of the seventh locking jaws 1520. The third passage 1540 may include, for example, two third passages each arranged at a position corresponding to the seventh locking jaw 1520, in case where each seventh locking jaw 1520 is provided at both ends of the curved surface 2251. The third passage 1540 may be formed, for example, as an empty space between the seventh locking part 1520 and a position where the seventh locking part 1421 is located, in the closed state. The third passage 1540 may be located, for example, in a region at least partially overlapping the portions adjacent to both ends of the bar 241 (e.g., the third forming portion 1440 of FIG. 14).

The passage (e.g., the second passage 1530 or the third passage 1540) may be formed, for example, to at least partially extend in the direction parallel to the side 2253 of the sliding frame 225. The second passage 1530 and the third passage 1540 may be disposed not to overlap each other, for example. The second passage 1530 and the third passage 1540 may be disposed to be parallel to each other, for example.

In the closed state of the electronic device 200, the locking parts (e.g., the sixth locking part 1411 or the seventh locking part 1421) may be arranged on the rear surface 2255 of the sliding frame 225, as shown in FIG. 16A. As the pull-out operation is performed in the closed state of the electronic device 200, the locking parts (e.g., the sixth locking part 1411 or the seventh locking part 1421) may move in the direction ③ (or in the pulled-out direction) along the passages (e.g., the second passage 1530 or the third passage 1540). Since the second passage 1530 and the third passage 1540 do not overlap each other, the sixth locking part 1411 may pass through the seventh locking jaw 1520 located in the lower part 2251c of the curved surface 2251, and then, may be caught on the sixth locking jaw 1510 located on the upper part 2251b of the curved surface 2251. As shown in FIG. 16B, when the sixth locking part 1411 is caught on the sixth locking jaw 1510, the seventh locking part 1421 may also be caught on the seventh locking jaw 1520. The present disclosure provides a plurality of locking parts (e.g., the sixth locking part 1411 or the seventh locking part 1421) as well as a plurality of locking jaws (e.g., 1510 and/or 1520), thereby allowing the force applied to the bending member 240 to be dispersed.

Figure 17:
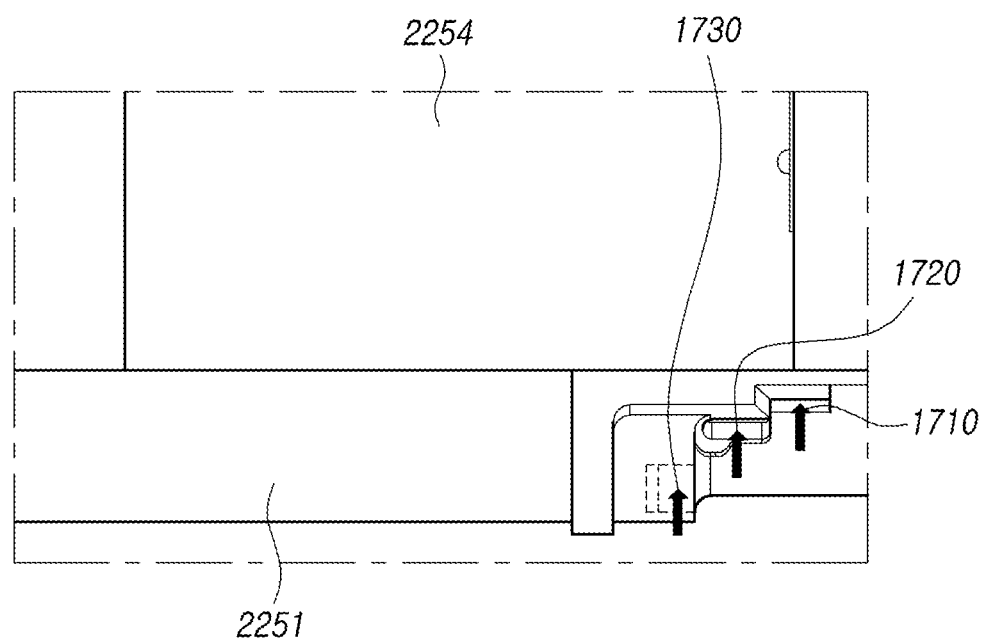
FIG. 17 is an enlarged plan view of a part of a sliding frame according to another example embodiment.

FIG. 17 is an enlarged plan view of a portion of the sliding frame according to another embodiment.

According to an embodiment, when the bending member 240 includes three locking parts arranged in different bars, the stop guide 2252 of the sliding frame 225 may include three locking jaws 1710, 1720 or 1730. These three locking jaws 1710, 1720 or 1730 may be arranged in parallel, and in the open state, may come into contact with the locking part corresponding to each of the locking jaws.

Figure 18:
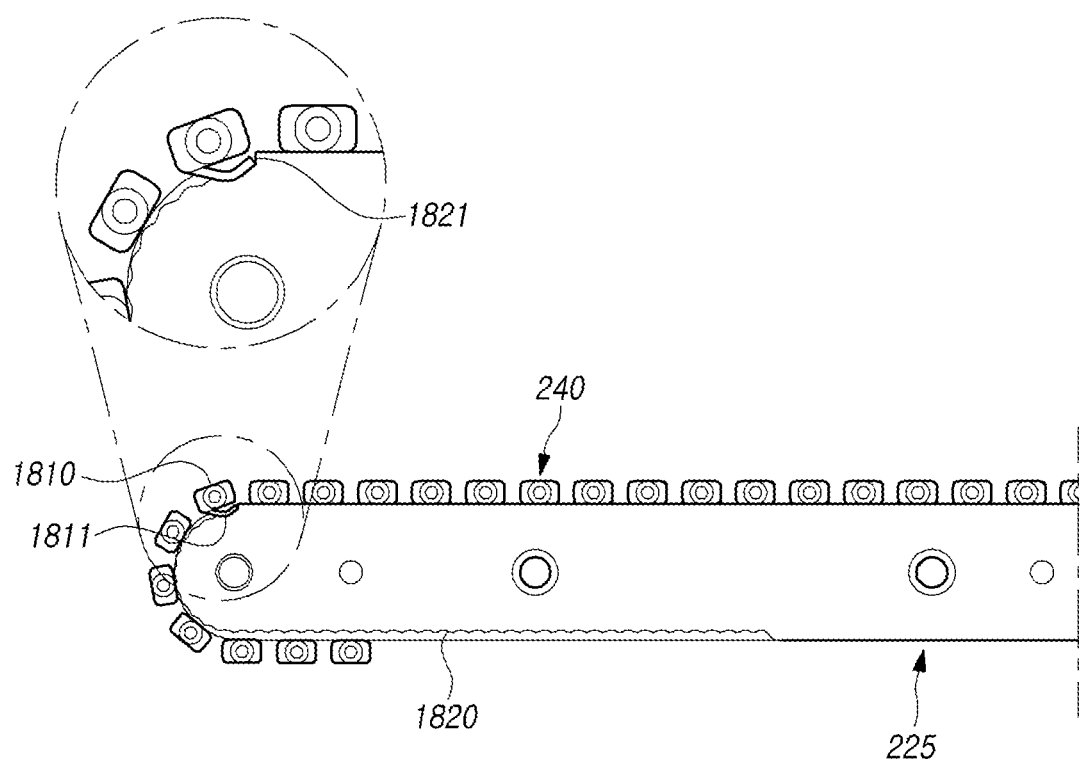
FIG. 18 is a cross-sectional view illustrating a bending member and a sliding frame according to another example embodiment.

FIG. 18 is a cross-sectional view illustrating the bending member and the sliding frame according to another embodiment. And, FIG. 19 is a perspective view illustrating a part of the bar determined in FIG. 18.

Figure 19:
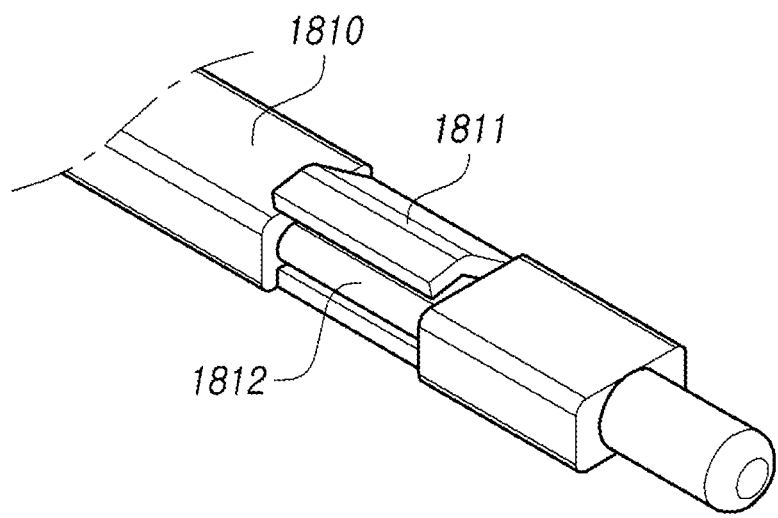
FIG. 19 is a perspective view illustrating a part of the bar determined in FIG. 18.

Referring not FIGS. 18 and 19, the electronic device 200 may include a first housing 210, a second housing 220, a flexible display 230, a guide rail 224, or a bending member 240. The configuration of the illustrated sliding frame 225 or bending member 240 may be substantially the same in part or in whole as the configuration of the sliding frame 225 or the bending member 240 of FIGS. 4 to 6 and FIGS. 9A to 12. In the following descriptions of the bending member 240, some description of a portion overlapping the configuration of the bending member 240 described with reference to FIGS. 4 to 6 will be omitted.

According to an embodiment, a predetermined bar (e.g., eighth bar 1810) of a plurality of bars of the bending member 240 may include a locking part (e.g., an eighth locking part 1811). The locking part (e.g., the eighth locking part 1811) may be formed of, for example, an elastic member. The locking part (e.g., the eighth locking part 1811) may be, for example, a leaf spring. The locking part (e.g., the eighth locking part 1811) may be coupled to, for example, a coupling groove 1812 formed adjacent to both ends of a predetermined bar (e.g., the eighth bar 1810). According to another embodiment, the locking part (e.g., the eighth locking part 1811) may be integrally formed with a predetermined bar (e.g., the eighth bar 1810).

According to an embodiment, the sliding frame 225 may include a protrusion 1820. The protrusion 1820 may be formed, for example, on a portion of the curved surface 2251 and the rear surface 2255 of the sliding frame 225. The protrusion 1820 may be formed, for example, on a path through which the locking part (e.g., the eighth locking part 1811) travels between the closed state and the open state.

According to an embodiment, the protrusion 1820 may include a locking jaw (e.g., the eighth locking jaw 1821). The locking jaw (e.g., the eighth locking jaw 1821) may be configured to stop the bending member 240 by causing the locking part (e.g., the eighth locking part 1811) to be caught, in the open state. The locking jaw (e.g., the eighth locking jaw 1821) may be formed to extend in the vertical direction from an end of the protrusion 1820, for example.

According to an embodiment, the locking part (e.g., the eighth locking part 1811) may move in contact with the protrusion 1820 during the pull-in and pull-out operations. The locking part (e.g., the eighth locking part 1811) may move in contact with the protrusion 1820, while being compressed and stretched depending on the shape of protrusion of the protrusion 1820. Even when the sliding frame 225 stops in an intermediate state during the pull-out operation due to the contact between the locking part (e.g., the eighth locking part 1811) and the protrusion 1820, it is possible for the bending member 240 to stop at an accurate position to prevent or reduce a chance of occurrence a birdcaging phenomenon of the flexible display (e.g., the flexible display 230 of FIG. 4).

According to an embodiment of the disclosure, an electronic device (e.g., the electronic device 200 of FIG. 2A) may comprise a housing (e.g., the first housing 210 of FIG. 2A); a sliding frame (e.g., the sliding frame 225 of FIG. 4), at least a portion of which is drawn out from the housing in a first direction during a pull-out operation, or at least a portion of which is retracted into the housing in a second direction opposite to the first direction during a pull-in operation, the sliding frame including a curved surface (e.g., the curved surface 2251 of FIG. 4) formed by bending at its side; a flexible display (e.g., the flexible display 230 of FIG. 2A) disposed in a space defined by the housing and the sliding frame, the flexible display including a first region (e.g., the first region 230a of FIG. 3A) visually visible from the outside, and a second region (e.g., the second region 230b of FIG. 3A) extending from the first region and varying in size depending on a pulled-in or pulled-out state of the sliding frame; and a bending member (e.g., the bars 241 of FIG. 6) disposed on a rear surface of the flexible display, the bending member including a plurality of bars arranged in a certain interval to support the flexible display, wherein the bending member comprises a first bar (e.g., the first bar 2411 of FIG. 6) including at least one first locking part (e.g., the first locking part 2411a of FIG. 6) protruding in an inner direction of the electronic device, among the plurality of bars, and wherein the sliding frame comprises at least one locking jaw (e.g., the first locking jaw 2252a of FIG. 9A) configured to cause the at least one first locking part to be caught at a predetermined position in its open state.

According to an embodiment of the disclosure, the first bar may be positioned adjacent to the curved surface in the open state.

According to an embodiment of the disclosure, when the first bar is located on an upper part of the curved surface (e.g., the upper part 2251b of the curved surface of FIG. 12A), in the open state, the at least one locking jaw may be located on the upper part of the curved surface.

According to an embodiment of the disclosure, the at least one locking jaw may be formed in a direction parallel to a front surface of the sliding frame (e.g., the front surface 2254 of the sliding frame of FIG. 9A).

According to an embodiment of the disclosure, when the first bar is located in a lower part of the curved surface (e.g., the lower part 2251c of the curved surface in FIG. 12A), in the open state, the at least one locking jaw may be located on the lower part of the curved surface.

According to an embodiment of the disclosure, the at least one locking jaw may be formed in a direction perpendicular to the front surface of the sliding frame.

According to an embodiment of the disclosure, the first bar may be located, in the open state, on a rear surface of the sliding frame (e.g., the rear surface 2255 of the sliding frame of FIG. 9A).

According to an embodiment of the disclosure, the at least one locking jaw may be disposed adjacent to the curved surface on the rear surface of the sliding frame.

According to an embodiment of the disclosure, the at least one locking jaw may be formed in a direction perpendicular to an upper surface of the sliding frame.

According to an embodiment of the disclosure, the at least one first locking part may be disposed adjacent to both ends of the first bar.

According to an embodiment of the disclosure, an even number of the at least one first locking part may be disposed adjacent to both ends of the bar so that they are symmetrical with respect to the center of the first bar (e.g., the center (C) of the bending member of FIG. 6).

According to an embodiment of the disclosure, the at least one locking jaw may be disposed adjacent to both ends of the curved surface.

According to an embodiment of the disclosure, the sliding frame may include at least one passage of an empty space (e.g., the first passage 2256 of FIG. 9B) formed in a path through which the at least one first locking part travels in a pull-in and/or pull-out operation of the sliding frame.

According to an embodiment of the disclosure, the bending member may comprise a second bar (e.g., the seventh bar 1420 of FIG. 14) including at least one second locking part (e.g., the seventh locking part 1421 of FIG. 14) protruding in an inner direction of the electronic device among the plurality of bars, and the first locking part and the second locking part may be arranged, in the pull-in and/or pull-out operation of the sliding frame, so that the travelling path of the first locking part and the travelling path of the second locking part do not overlap each other.

According to an embodiment of the disclosure, the at least one locking jaw may comprise at least one first locking jaw (e.g., any of the first through seventh locking jaw, with an example being 1510 in FIG. 15A) caught on the at least one first locking part and disposed on the upper part of the curved surface, and at least one second locking jaw (e.g., any other locking jaw, with an example being 1520 in FIG. 15A) caught on the at least one second locking part and disposed on the lower part of the curved surface.

According to an embodiment of the disclosure, the sliding frame may comprise at least one first passage (e.g., the second passage 1530 of FIG. 15B) formed in a path through which the at least one first locking part travels, and at least one second passage (e.g., the third passage 1540 of FIG. 15B) formed in a path through which the at least one second locking part travels, in the pull-in or pull-out operation of the sliding frame.

According to an embodiment of the disclosure, the at least one first passage and the at least one second passage may not overlap each other.

According to an embodiment of the disclosure, the maximum or enlarged locking length (e.g., the maximum locking length W of FIG. 12B) overlapping in case where the at least one first locking part is caught on the at least one locking jaw may be greater than the maximum or enlarged separation distance between the first bar and the sliding frame.

According to an embodiment of the disclosure, the at least one first locking part may comprise a locking surface (e.g., the locking surface 2411b of FIG. 12A) configured to be caught on the at least one locking jaw, and an angle formed by the locking surface and the plane of the first bar (e.g., the first angle D1 of FIG. 12A) may be formed, in the open state, to be the same as an angle formed by the plane of the first bar and the locking jaw (e.g., the second angle D2 of FIG. 12B).

According to an embodiment of the disclosure, the bending member may be attached to a portion of the rear surface of the flexible display.

According to an embodiment of the disclosure, the open state may be a state in which the second region is maximized or enlarged.

According to an embodiment of the disclosure, the at least one first locking part and the at least one locking jaw may be configured to prevent or reduce a chance of the flexible display from being lifted from the housing or the sliding frame, in the pull-out operation of the sliding frame.

According to an embodiment of the disclosure, the at least one first locking part and the at least one locking jaw may be configured to prevent or reduce a chance of the flexible display from being lifted from the housing or the sliding frame, in performing the pull-in operation from the open state of the sliding frame.

According to an embodiment of the disclosure, the at least one first locking part and the at least one locking jaw may be configured to prevent or reduce a chance of distortion of the bending member, in the pull-out operation of the sliding frame, due to narrowing of a gap between the bars.

According to an embodiment of the disclosure, the at least one first locking part and the at least one locking jaw may be configured to prevent or reduce a chance of distortion of the bending member, in the pull-in operation of the sliding frame, due to narrowing of the gap between the bars.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via at least a third element.

As used in connection with various embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a housing;
   a sliding frame, at least a portion of which is configured to be drawn out from the housing in a first direction, and/or at least a portion of which is configured to be drawn in the housing in a second direction opposite to the first direction;
   a flexible display including a first region visible from an outside, and a second region extending from the first region and varying in size depending on a pulled-in or pulled-out state of the sliding frame; and
   a bending member disposed a rear surface of the flexible display, the bending member including a plurality of bars arranged in an interval to support the flexible display;
   wherein the bending member comprises a first bar including at least one first locking part protruding in an inner direction of the electronic device, among the plurality of bars, and
   wherein the sliding frame comprises at least one locking jaw configured to cause the at least one first locking part to be caught.

2. The electronic device of claim 1,
   wherein the sliding frame includes a curved surface,
   wherein the first bar is disposed adjacent to the curved surface in the open state.

3. The electronic device of claim 2,
   wherein the sliding frame includes a curved surface,
   wherein when the first bar is located on an upper part of the curved surface, in the open state, the at least one locking jaw is located on the upper part of the curved surface.

4. The electronic device of claim 3, wherein the at least one locking jaw is formed in a direction generally parallel to a front surface of the sliding frame.

5. The electronic device of claim 2,
   wherein the sliding frame includes a curved surface,
   wherein when the first bar is located in a lower part of the curved surface, in the open state, the at least one locking jaw is disposed on the lower part of the curved surface.

6. The electronic device of claim 5, wherein the at least one locking jaw is formed in a direction perpendicular to a front surface of the sliding frame.

7. The electronic device of claim 1, wherein the first bar is disposed, in the open state, on a rear surface of the sliding frame.

8. The electronic device of claim 7,
   wherein the sliding frame includes a curved surface,
   wherein the at least one locking jaw is disposed adjacent to the curved surface on the rear surface of the sliding frame.

9. The electronic device of claim 8, wherein the at least one locking jaw is formed in a direction generally perpendicular to a front surface of the sliding frame.

10. The electronic device of claim 1,
    wherein the sliding frame includes a curved surface,
    wherein the at least one first locking part is disposed adjacent to both ends of the first bar, and
    wherein the at least one locking jaw is disposed adjacent to both ends of the curved surface.

11. The electronic device of claim 10, wherein an even number of the at least one first locking part are disposed adjacent to both ends of the first bar so as to be symmetrical with respect to a center of the first bar.

12. The electronic device of claim 1, wherein the sliding frame comprises at least one passage of an empty space formed in a path through which the at least one first locking part travels in the pull-in and/or pull-out operation of the sliding frame.

13. The electronic device of claim 1,
    wherein the sliding frame includes a curved surface,
    wherein the bending member comprises a second bar including at least one second locking part protruding in an inner direction of the electronic device among the plurality of bars, and
    wherein the first locking part and the second locking part are arranged, in the pull-in and/or pull-out operation of the sliding frame, so that a travelling path of the first locking part and a travelling path of the second locking part do not overlap each other, and
    wherein the at least one locking jaw comprises at least one first locking jaw configured to be caught on the at least one first locking part and disposed on an upper part of the curved surface, and at least one second locking jaw configured to be caught on the at least one second locking part and disposed on a lower part of the curved surface.

14. The electronic device of claim 13,
    wherein the sliding frame comprises at least one first passage formed in a path through which the at least one first locking part travels, and at least one second passage formed in a path through which the at least one second locking part travels, in the pull-in and/or pull-out operation of the sliding frame, and wherein the at least one first passage and the at least one second passage do not overlap each other.

15. The electronic device of claim 1, wherein an overlapping maximum locking length when the at least one first locking part is caught on the at least one locking jaw at a predetermined position in an open state is greater than a maximum separation distance between the first bar and the sliding frame.

16. The electronic device of claim 1,
wherein the at least one first locking part comprises a locking surface configured to be caught on the at least one locking jaw, and
wherein an angle formed by the locking surface and a plane of the first bar is formed, in the open state, to be generally the same as an angle formed by the plane of the first bar and the locking jaw.

17. The electronic device of claim 1, wherein the bending member is attached to a portion of the rear surface of the flexible display.

18. The electronic device of claim 1, wherein the open state is a state in which the second region is substantially maximized and/or enlarged.

19. The electronic device of claim 1,
wherein the at least one first locking part and the at least one locking jaw are configured to reduce a chance of the flexible display from being lifted from the housing and/or the sliding frame, in the pull-out operation of the sliding frame, and
wherein the at least one first locking part and the at least one locking jaw are configured to reduce a chance of the flexible display from being lifted from the housing and/or the sliding frame, when performing the pull-in operation in the open state of the sliding frame.

20. The electronic device of claim 1,
wherein the at least one first locking part and the at least one locking jaw are configured to reduce a chance of distortion of the bending member, due to narrowing of a gap between the bars in the pull-out operation of the sliding frame, and
wherein the at least one first locking part and the at least one locking jaw are configured to reduce a chance of distortion of the bending member, due to narrowing of the gap between the bars in the pull-in operation of the sliding frame.

* * * * *